US012633833B2

(12) United States Patent
Brown

(10) Patent No.: US 12,633,833 B2
(45) Date of Patent: May 19, 2026

(54) BIPOLAR DC-DC AUTO-CONVERTER MODULE

(71) Applicant: Terminal Power LLC, Cedarville, OH (US)

(72) Inventor: Gerald Murray Brown, Cedarville, OH (US)

(73) Assignee: Terminal Power LLC, Cedarville, OH (US)

( * ) Notice: Subject to any disclaimer, the term of this patent is extended or adjusted under 35 U.S.C. 154(b) by 0 days.

(21) Appl. No.: 19/362,358

(22) Filed: Oct. 18, 2025

(65) Prior Publication Data

US 2026/0112973 A1 Apr. 23, 2026

Related U.S. Application Data

(60) Provisional application No. 63/709,449, filed on Oct. 20, 2024.

(51) Int. Cl.
*H02M 3/158* (2006.01)
*H02M 1/00* (2007.01)

(52) U.S. Cl.
CPC ........... *H02M 3/158* (2013.01); *H02M 1/007* (2021.05)

(58) Field of Classification Search
CPC .... H02J 1/102; H02J 3/38; H02J 3/46; H02M 3/158; H02M 1/007
See application file for complete search history.

(56) References Cited

U.S. PATENT DOCUMENTS

2018/0102646 A1* 4/2018 Apte ......................... H02J 1/14
2023/0155515 A1* 5/2023 Zhang ..................... H02M 7/12
363/13

* cited by examiner

*Primary Examiner* — Carlos Amaya
(74) *Attorney, Agent, or Firm* — FBT GIBBONS LLP

(57) ABSTRACT

A bipolar DC-DC auto-converter module includes a positive source terminal, a negative source terminal, a positive load terminal, a negative load terminal, a first isolated DC-DC converter, and a second isolated DC-DC converter. The first isolated DC-DC converter includes a first input circuit and a first output circuit. The first input circuit includes a first positive input terminal and a first negative input terminal. The first output circuit comprises a first positive output terminal and a first negative output terminal. The second isolated DC-DC converter includes a second input circuit and a second output circuit. The second input circuit includes a second positive input terminal and a second negative input terminal. The second output circuit includes a second positive output terminal and a second negative output terminal.

30 Claims, 9 Drawing Sheets

BIPOLAR DC-DC AUTO-CONVERTER MODULE

REFERENCE TO RELATED APPLICATION

This application claims priority of U.S. provisional patent application Ser. No. 63/709,449, entitled BIPOLAR DC-DC AUTO-CONVERTER MODULE, filed Oct. 20, 2024, and hereby incorporates this patent application by reference herein in its entirety.

TECHNICAL FIELD

Embodiments of the technology relate, in general, to systems, apparatuses and methods providing technical solutions for enhanced direct current to direct current (DC-DC) converters.

BACKGROUND

DC-DC converters are widely used to efficiently produce a regulated voltage from a source that may or may not be well controlled to a load that may or may not be constant. A DC-to-DC converter is an electronic circuit or electromechanical device that converts DC voltage from one voltage level to another. Common topologies include buck and boost converters. A buck converter steps a voltage down, producing a voltage lower than the input voltage. A boost converter steps a voltage up, producing a voltage higher than the input voltage. DC-DC converters come in non-isolated and isolated varieties.

Some applications utilize bipolar power supplies with both positive and negative source voltages ($+V_s$ and $-V_s$) with respect to a common ground. Bipolar loads operate at both positive and negative load voltages ($+V_L$ and $-V_L$) with respect to a common ground. In some instances, the common grounds of the source and load may be connected together. Bipolar loads generally require two DC-DC converters, one operating at $+V_s$ to supply $+V_L$ to the positive side of the load and one operating from $-V_s$ to supply $-V_L$ to the negative side of the load.

BRIEF DESCRIPTION OF THE DRAWINGS

It is believed that certain embodiments will be better understood from the following description taken in conjunction with the accompanying drawings in which.

DETAILED DESCRIPTION

Figure 1:
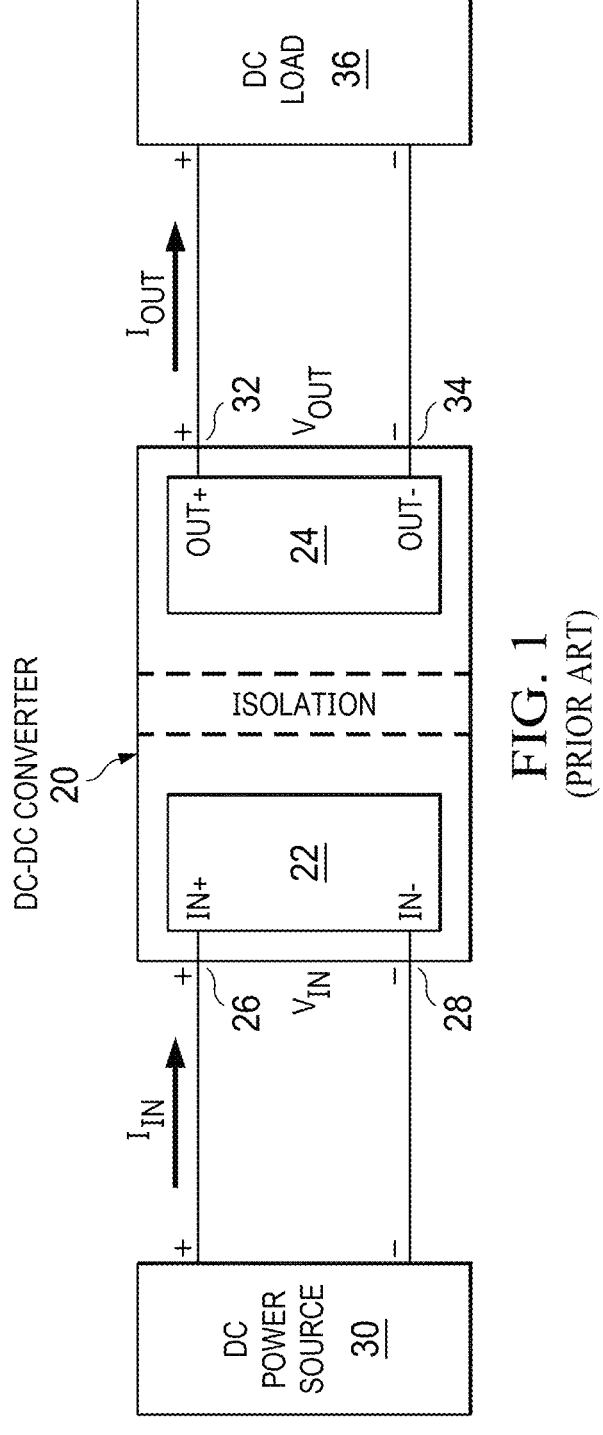
FIG. 1 is a schematic view depicting a conventional DC-DC converter associated with a DC power source and a DC load.

Various non-limiting embodiments of the present disclosure will now be described to provide an overall understanding of the principles of the structure, function, and use of the apparatuses, systems, methods, and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments. In various embodiments disclosed herein, a single component can be replaced by multiple components and multiple components can be replaced by a single component to perform a given function or functions. Except where such substitution would not be operative, such substitution is within the intended scope of the embodiments.

The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Technical solutions to enhance the operating capabilities of DC-DC converters can be achieved by the systems, apparatuses and methods of the present disclosure. The disclosed systems, apparatuses and methods achieve improvements to base DC-DC converters to have greatly increased efficiency and power capability.

In general, the disclosed systems, apparatuses and methods enable a pair of unipolar base DC-DC converters (also referred to herein as "base modules"), including conventional and state-of-the-art DC-DC converters, to be installed in configurations, referred to herein as "bipolar auto-connections," that can greatly increase efficiency and power capability, and/or reduce cost, size, weight, and/or footprint for the same power level. The bipolar auto-connections can double the nominal voltage rating of the DC-DC converter base modules. The apparatus disclosed is referred to herein as a "bipolar auto-converter," and the systems and methods relate to bipolar auto-converter technology. Disclosed is a representative family of bipolar auto-converter configurations applicable to DC-DC converters that enhance their individual operating capabilities. Of the various configurations identified in the disclosure, some result in improved efficiency and increase the power throughput by, for example, as much as an order of magnitude. Other configurations have a more modest impact on efficiency and power rating but can be useful in applications where larger voltage ratios are required.

Bipolar auto-converter technology can incorporate existing or custom-built base modules. In one embodiment, the bipolar auto-converter can be a retrofit or aftermarket technology that allows two commercial-off-the-shelf (COTS) isolated unipolar DC-DC converters to be reconfigured by means of galvanically connecting certain terminals together to form a non-isolated bipolar DC-DC converter with increased efficiency and power capability. The technology can also encompass new design paradigms and tools to facilitate the repurposing of existing unipolar DC-DC products for bipolar solutions with higher power and efficiency, and/or with lower cost. The bipolar auto-converter and its associated engineering tools constitute a unique after-market product that can be employed across the entire field of power electronics.

The examples discussed herein are examples only and are provided to assist in the explanation of the apparatuses, devices, systems and methods described herein. None of the features or components shown in the drawings or discussed below should be taken as mandatory for any specific implementation of any of these apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

The examples discussed herein utilize shorthand symbols to indicate certain variables, such as, for example, voltage, current, power, and efficiency. Table 1 provides an overview of some of the shorthand symbols that are used throughout this disclosure along with a corresponding definition. It is to be appreciated that the shorthand symbols provided in Table 1 are often appended with different subscript numerals to identify the particular embodiment to which it relates.

TABLE 1

| Variable Names and Definitions | |
| --- | --- |
| a | (subscript) auto-converter |
| b | (subscript) base module |
| $\eta_a$ | Efficiency, Auto-Converter = $S_a/S_{in}$ |
| $\eta_b$ | Efficiency, Base Module = $S_b/S_{in}$ |
| $G_a$ | Power Gain, Auto-Converter = $S_a/S_b$ |
| $G_i$ | Current Gain = $1_{out}/1_{in}$ |
| $G_v$ | Voltage Gain = $V_{out}/V_{in}$ |
| $1_{in}$ | Input Current (Amps) |
| $1_{out}$ | Output Current (Amps) |
| k | Scale factor to accommodate other voltages |
| m | Scale factor to accommodate other currents |
| n | Voltage Ratio, Base Module = $V_{in}/V_{out}$, n ≥ 1 |
| $\rho_b$ | Power Loss, Base Module (Watts) |
| $S_a$ | Output Power, Auto-Converter = $V_{out}*1_{out}$ (Watts) |
| $S_b$ | Output Power, Base Module = n*1 = 1*n (Watts) |
| $S_{in}$ | Input Power = $V_{in}*1_{in}$ (Watts) |
| $V_{in}$ | Input Voltage (Volts) |
| $V_{out}$ | Output Voltage (Volts) |

Embodiments are hereinafter described in detail in connection with the views and examples of FIGS. 1-9, wherein like numbers indicate the same or corresponding elements throughout the views. FIG. 1 illustrates a conventional isolated DC-DC converter 20 that includes an input circuit 22 and an output circuit 24 that are galvanically isolated from each other. It is to be appreciated that input and output circuits described as being galvanically isolated from each other can be understood to mean that there is no direct current (DC) electrical conduction path provided between the input and output terminals such that no DC electric current is conducted between the input and output terminals during normal (e.g., non-fault) operation of the isolated DC-DC converter.

The input circuit 22 can include positive input terminal 26 and a negative input terminal 28 that are electrically coupled to a DC power source 30. The output circuit 24 can include a positive output terminal 32 and a negative output terminal 34 that are electrically coupled with a DC load 36. The DC power source 30 can be configured to provide DC input power $S_{in}$ to the conventional isolated DC-DC converter 20 in the form of an input current $I_{in}$ through the input circuit 22 and an input voltage $V_{in}$ across the positive and negative input terminals 26, 28. The conventional isolated DC-DC converter 20 can be configured to convert the DC input power $S_{in}$ into DC output power $S_b$ that is delivered to the DC load 36 in the form of an output current $I_{out}$ through the output circuit 24 and an output voltage $V_{out}$ across the positive and negative output terminals 32, 34.

The input circuit 22 and the output circuit 24 can have a voltage ratio n that describes the operation of the conventional isolated DC-DC converter 20 and the output voltage $V_{out}$ that is provided across the positive and negative output terminals 32, 34. The DC-DC converter can have a voltage gain G. (defined as $V_{out}/V_{in}$), a current gain $G_i$ (defined as $I_{out}/I_{in}$), and an efficiency $\eta_b$ (defined as $S_b/S_{in}$). The voltage gain $G_v$ and the current gain $G_i$ can be dependent on the voltage ratio n. Under ideal circumstances, the efficiency $\eta_b$ of the conventional isolated DC-DC converter 20 is 100%. However, in reality, the conventional isolated DC-DC converter 20 is subject to internal losses such that the efficiency $\eta_b$ is less than 100%, and is typically between 85% and 95%.

In one embodiment, the voltage ratio of the DC-DC converter can be n:1, where n is greater than 1 such that the conventional isolated DC-DC converter 20 is considered a "step-down" converter. In such an embodiment, the voltage gain $G_v$ is equal to 1/n and the ideal current gain is equal to n. In another embodiment, the voltage ratio of the DC-DC converter can be 1:n, where n is greater than 1 such that the conventional isolated DC-DC converter 20 is considered a "step-up" converter. In such an embodiment, the voltage gain $G_v$ is equal to n and the ideal current gain is equal to 1/n. It is to be appreciated that the input current $I_{in}$ is shown to flow into the conventional isolated DC-DC converter 20 and the output current $I_{out}$ is shown to flow out of the conventional isolated DC-DC converter 20. The conventional isolated DC-DC converter 20 can accordingly be configured as a "forward" converter. However, if the input and output currents $I_{in}$, $I_{out}$ were to flow in the opposite direction (e.g., with the output current $I_{out}$ flowing into the conventional isolated DC-DC converter 20 and the input current $I_{in}$ flowing out of the conventional isolated DC-DC converter 20), the conventional isolated DC-DC converter 20 can instead be configured as a "reverse" converter. In some embodiments, the isolated DC-DC converter can be configured as a reverse converter by installing a forward converter backwards.

The conventional isolated DC-DC converter 20 can utilize any conventional topology, including but not limited to circuits utilizing resonant operation, ZVS, ZCS, and SAC. The input current $I_{in}$ and the output current $I_{out}$ of the DC-DC converter 20 can be considered to be DC, with minimal harmonic content. That is, any filter elements that may be utilized to stabilize the operation of the DC-DC converter 20 (e.g., according to a manufacturer's specifications) can be understood to be incorporated into the input circuit 22 and the output circuit 24 and are thus not illustrated in FIG. 1.

In other embodiments, the DC-DC converter 20 can be configured to conduct current in both forward and reverse directions, resulting in a bidirectional DC-DC converter. In some embodiments, the DC power source 30 and the DC load 36 can be configured to supply and absorb power, respectively. In other embodiments the load can be regenerative and the DC power source 30 and the DC load 36 can absorb and supply power, respectively.

Figure 2:
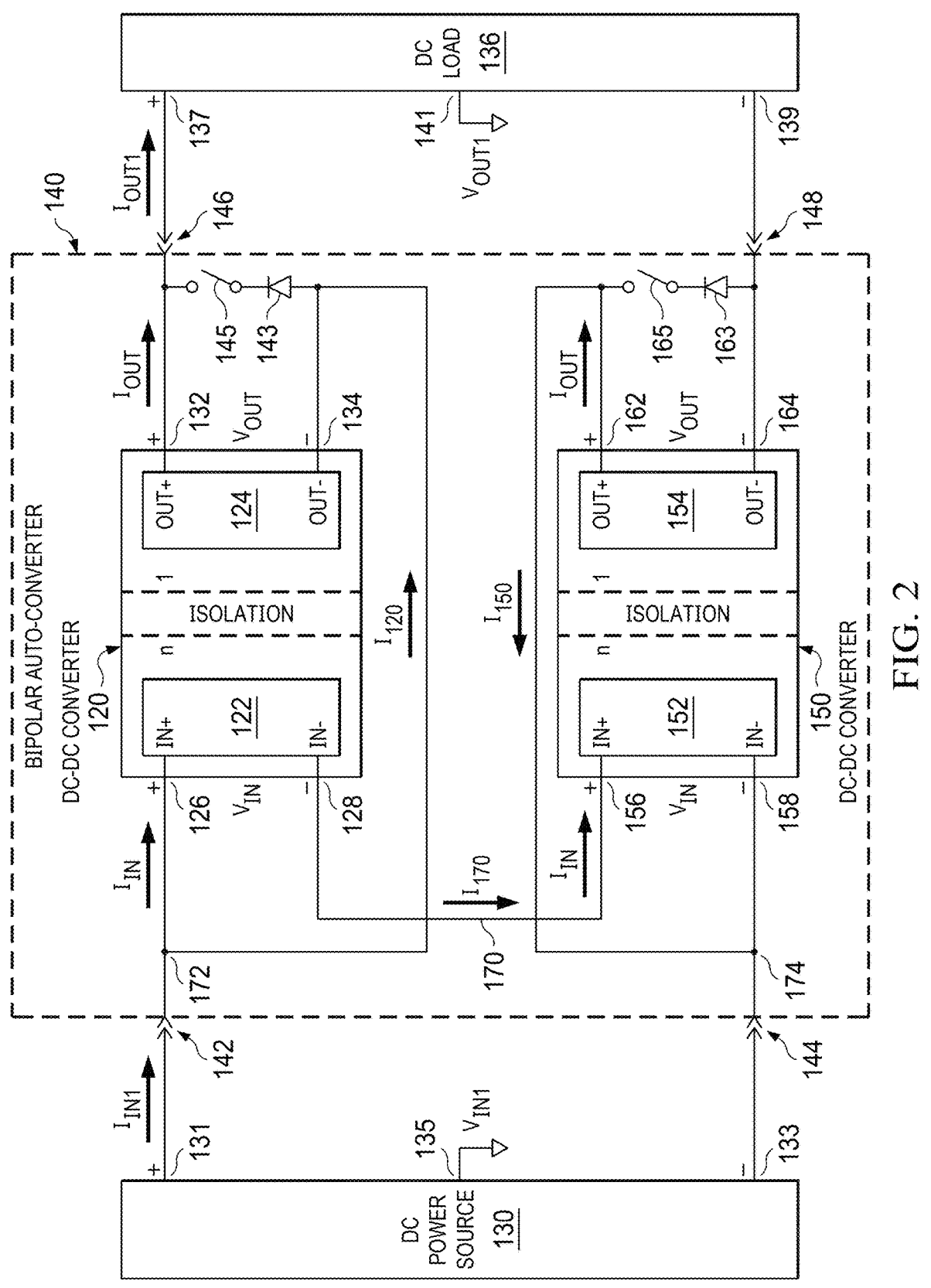
FIG. 2 is a schematic view depicting a bipolar DC-DC auto-converter module, in accordance with one embodiment.

FIG. 2 illustrates one embodiment of a bipolar DC-DC auto-converter module 140 (hereinafter bipolar auto-converter 140) that includes a first isolated DC-DC converter 120 and a second isolated DC-DC converter 150 that are the same as the isolated DC-DC converter illustrated in FIG. 1 and are each configured as a step down converter (i.e., with a voltage ratio of n:1). For example, the first isolated DC-DC converter 120 can include an input circuit 122 and an output circuit 124 that have a voltage ratio of n:1. The input circuit 122 can include a positive input terminal 126 and a negative input terminal 128. The output circuit 124 can include a positive output terminal 132 and a negative output terminal 134. An input current $I_{in}$ can be present at the positive input terminal 126 and an output current $I_{out}$ can be present at the positive output terminal 132. Likewise, the second isolated DC-DC converter 150 can include an input circuit 152 and an output circuit 154 that also have a voltage ratio of n:1. The input circuit 152 can include a positive input terminal 156 and a negative input terminal 158. The output circuit 154 can include a positive output terminal 162 and a negative output terminal 164. An input current $I_{in}$ can be present at the positive input terminal 156 and an output current $I_{out}$ can be present at the positive output terminal 162. The magnitude of the input currents $I_{in}$ at each the positive input terminals 126, 156 can be substantially the same (factoring out negligible differences due to internal losses), and the magnitude of the output currents $I_{out}$ at the positive output terminals 132, 162 can be substantially the same (factoring out negligible differences due to internal losses).

The bipolar auto-converter 140 can be electrically coupled with a bipolar DC power source 130 and a bipolar DC load 136. The bipolar DC power source 130 can include a positive output terminal 131, a negative output terminal 133, and a ground (i.e., zero voltage) terminal 135. The bipolar DC load 136 can include a positive input terminal 137, a negative input terminal 139, and a ground (i.e., zero voltage) terminal 141. The bipolar auto-converter 140 can include a positive source terminal 142 and a negative source terminal 144 that cooperate to facilitate connection of the positive and negative output terminals 131, 133, respectively, of the DC power source 130 to the auto-converter 140. The auto-converter 140 can include a positive load terminal 146 and a negative load terminal 148 that cooperate to facilitate connection of the positive and negative input terminals 137, 139, respectively, of the DC load 136 to the auto-converter 140.

For bipolar DC-DC applications, the zero voltage terminals 135, 141 can be connected to a common system ground (i.e., chassis ground) and in some instances can also be connected to each other. The first and second isolated DC-DC converters 120, 150 can be electrically isolated from (i.e., not galvanically connected to) the common system ground. In some embodiments, there may be a high impedance path provided within the auto-converter 140 that is coupled to the system ground for the purpose of maintaining proper voltage balance between DC-DC converters 120 and 150, or as part of a ground fault protection circuit. In other instances, a ground can be present on only one of the zero voltage terminals 135, 141 and in other instances a ground may not be present on either of the zero voltage terminals 135, 141. As such, the zero voltage terminal 135 of the bipolar DC power source 130 and the zero voltage terminal 141 of the bipolar DC load 136 may not have the same potential.

The bipolar auto-converter 140 can include certain galvanic connections (i.e., auto-connections) between the terminals 126, 128, 132, 134, 156, 158, 162, 164 of the first isolated DC-DC converter 120 and the second isolated DC-DC converter 150. It is to be appreciated that components described as being galvanically connected together can be understood to have a DC resistance that is low enough that the voltage drop across the galvanic connection when the auto-converter is operating at rated DC current is reasonably small (e.g., less than 2% of the rated input or output voltage, whichever is smaller). For low power auto-converters (e.g., less than 10 W), this value could be less than 100 mΩ. For high power auto-converters (e.g., greater than 10 KW), or auto-converters with very high current ratings (e.g., 400 A), the DC resistance could be less than 10 mΩ. Suitable resistance values can be established by anyone skilled in the art. The galvanic connections are described herein in terms of their DC impedance, but it is to be appreciated that the galvanic connections can also be understood to have an AC impedance that is also low enough such that any AC harmonics present at the galvanic connection do not adversely affect the performance of the bipolar auto-converter.

The bipolar DC power source 130 can be configured to supply a voltage $+V_s$ at positive input terminal 131 with respect to the ground terminal 135 and a voltage $-V_s$ at negative input terminal 133 with respect to the ground terminal 135. The bipolar DC load 136 can be configured to receive a voltage $+V_L$ at positive input terminal 137 with respect to the ground terminal 141 and a voltage $-V_L$ at negative input terminal 139 with respect to ground terminal 141. The DC power source 130 can be configured to provide DC input power $S_{in1}$ to the first and second isolated DC-DC converters 120, 150 in the form of an input current $I_{in1}$ that flows from the positive output terminal 131 into the positive source terminal 142 at an input voltage $V_{in1}$ provided across the positive and negative source terminals 142, 144, where $V_{in1}=2*V_s$.

The bipolar auto-converter 140 can be configured to convert the DC input power $S_{in1}$ into DC output power $S_{a1}$ that is delivered to the DC load 136 in the form of an output current $I_{out1}$ that flows out of the positive load terminal 146 and into the positive input terminal 137 at an output voltage $V_{out1}$ provided across the positive and negative load terminals 146, 148, where $V_{out1}=2*V_L$. For bipolar applications it is assumed that input and output voltages are symmetric with respect to ground and that $V_{in1}=2*V_s$ and $V_{out1}=2*V_L$. It is to be appreciated, however, that the DC power source 130 need not be bipolar and instead can be any of a variety of suitable alternative DC power sources that are configured to generate DC power, such as, for example, a DC motor, a battery, a photovoltaic cell, or an AC/DC converter. It is also to be appreciated that the DC load 136 need not be bipolar and instead can be any of a variety of suitable alternative DC loads that are capable of receiving DC power, such as, for example, a DC motor, a rechargeable DC battery, a light bulb, or a DC/AC converter. As such, the bipolar auto-converter 140 can be operated with a unipolar source and a unipolar load so long as proper attention is given to electrical insulation requirements with respect to system ground.

The bipolar auto-converter 140 can have a voltage gain Gui (defined as $V_{out1}/V_{in1}$), a current gain $G_{i1}$ (defined as $I_{out1}/I_{in1}$), a power gain $G_{a1}$ (defined as $S_{a1}/(2*S_b)$), and an efficiency rating $\eta_{a1}$ (defined as $S_{a1}/S_{in1}$). The power gain $G_{a1}$ can be understood to be distinct from the efficiency $\eta_{a1}$. While the efficiency $\eta_b$ of the first and second DC/DC converters 120, 150 is always less than 1, the power gain $G_{a1}$ can be significantly larger than unity. The efficiency rating $\eta_{a1}$ of the auto-converter 140 can accordingly exceed the efficiency no of the first and second DC/DC converters 120, 150 which can enable the efficiency of the bipolar auto-converter 140 to approach unity more effectively than the first and second DC/DC converters 120, 150 alone. The electrical connections to the bipolar auto-converter 140 operate at twice the power and voltage as each base module while maintaining the same current and the same conductor size and losses, further improving the efficiency of the bipolar auto-converter 140.

The positive source terminal 142, the negative source terminal 144, the positive load terminal 146, and the negative load terminal 148 (collectively "terminals") can allow for easy connection of the DC power source 130 and the DC load 136 to the bipolar auto-converter 140. As such, the bipolar auto-converter 140 can be readily employed in any of a variety of electrical applications that utilize a DC-DC converter. In one embodiment, each of the terminals 142, 144, 146, 148 can comprise terminal blocks (not shown) that are configured to allow for electrical connection to the bipolar auto-converter 140 with screws or other similar releasable fasteners. It is to be appreciated that the terminals 142, 144, 146, 148 can include be any of a variety of suitable alternative releasable electrical connection arrangements, such as, for example, a plug, or any of a variety of suitable non-releasable electrical connection arrangements, such as a soldering terminal or a pin that is provided through a printed circuit board.

The first and second isolated DC-DC converters 120, 150 can be wired together and to the terminals 142, 144, 146, 148 within the bipolar auto-converter 140 in a configuration that is different from the conventional arrangement illustrated in FIG. 1 and that enhances the performance of the bipolar auto-converter 140 over conventional converter topologies. Still referring to FIG. 2, the positive input terminal 126 of the first isolated DC-DC converter 120 can be galvanically connected to the positive source terminal 142 at location 172. The negative input terminal 128 of the first isolated DC-DC converter 120 can be galvanically connected to the positive input terminal 156 of the second isolated DC-DC converter 150 via connection 170. The negative input terminal 158 of the second isolated DC-DC converter 150 can be galvanically connected to the negative source terminal 144 at location 174. The positive output terminal 132 of the first isolated DC-DC converter 120 can be galvanically connected to the positive load terminal 146. The negative output terminal 134 of the first isolated DC-DC converter 120 can be galvanically connected to the positive input terminal 126 such that the positive input terminal 126, the negative output terminal 134, and the positive source terminal 142 are all galvanically connected together. During operation, a current $I_{120}$ can be generated that flows into the negative output terminal 134 such that the currents are added on the high voltage side of the first isolated DC-DC converter 120 which can be beneficial for the overall power throughput and efficiency of the bipolar auto-converter 140. The negative output terminal 164 of the second isolated DC-DC converter 150 can be galvanically connected to the negative load terminal 148. The positive output terminal 162 of the second isolated DC-DC converter 150 can be galvanically connected to the negative input terminal 158 such that the negative input terminal 158, the positive output terminal 162, and the negative source terminal 144 are all galvanically connected together. During operation, the output current $I_{out}$ generated at the positive output terminal 162 can flow out of the positive output terminal 162 and towards the negative input terminal 158 (e.g., as indicated by the current $I_{150}$) such that the currents are added on the high voltage side of the second isolated DC-DC converter 150 which can be beneficial for the overall power throughput and efficiency of the bipolar auto-converter 140. It is to be appreciated that these galvanic connections have sufficiently low impedance to DC currents that they don't introduce significant losses. On the contrary, the galvanic connections can allow the rated losses of the bipolar auto-converter 140 to effectively be the same as the rated losses of the first isolated DC-DC converter 120 plus the rated losses of the second isolated DC-DC converter 150 even while the bipolar auto-converter 140 has significantly higher power throughput. This can lead to a dramatic improvement in efficiency.

By wiring the first and second isolated DC-DC converters 120, 150 in this manner, the auto-converter 140 can have the performance characteristics listed in Table 2a which are defined as a function of n.

9

TABLE 2a

| Voltage Gain $G_{v1}$ | $\dfrac{n+1}{n}$ |
|---|---|
| Current Gain $G_{i1}$ | $\left(\dfrac{n}{n+1/\eta_b}\right)$ |
| Power Gain $G_{a1}$ | $n+1$ |
| Efficiency Rating $\eta_{a1}$ | $\left(\dfrac{n+1}{n+1/\eta_b}\right)$ |

When the output voltage $V_{out}$ of the first and second isolated base DC-DC converters 120, 150 is 1 VDC, the performance characteristics for the bipolar auto-converter 140 listed in Table 2b can be achieved as a function of n, where the source voltage $V_{in1}=2*V_s$ and the load voltage $V_{out1}=2*V_L$.

TABLE 2b

| | |
|---|---|
| Base Module Input Voltage $V_{in}$ | n |
| Input Voltage $V_{in1}$ | 2n |
| Output Voltage $V_{out1}$ | 2(n + 1) |
| Input Current $I_{in1}$ | $n + 1/\eta_b$ |
| Base Module Input Current $I_{in}$ | $\dfrac{1}{\eta_b}$ |
| Output Current $I_{out1}$ | n |
| Base Module Output Current $I_{out}$ Current $I_{120}$ and $I_{150}$ | n |

The performance characteristics identified in Tables 2a and 2b take into account the relative efficiencies (i.e., $\eta_b$) of the base modules and thus can be considered to be a realistic (i.e., real world) model of the performance of the bipolar auto-converter 140. The performance characteristics of the bipolar auto-converter 140 under ideal circumstances are also shown in FIG. 2 for purposes of illustration and comparison.

The bipolar auto-converter 140 can have a larger power gain $G_{a1}$, higher efficiency $\eta_{a1}$, and smaller voltage gain $G_{v1}$ than the conventional isolated DC-DC converter 20 illustrated in FIG. 1. As the value of n increases the power gain $G_{a1}$ increases, the efficiency $\eta_{a1}$ approaches unity, and the voltage gain $G_{v1}$ approaches unity. The efficiency $\eta_{a1}$ can dramatically increase for larger n values. The bipolar auto-converter 140 can effectively be a small boost positive converter. The bipolar auto-converter 140 can provide higher power throughput and better efficiency than conventional topologies and can be smaller, more lightweight, and less expensive. This can especially be true for larger n values (e.g., n≥6).

In one embodiment, the bipolar auto-converter 140 can include diodes 143, 163 that are associated with the output circuits 124, 154, respectively, of the first and second isolated DC-DC converters 120, 150. The diode 143 can have a cathode and an anode that are electrically connected to the positive and negative output terminals 132, 134, respectively, of the first isolated DC-DC converter 120. The diode 163 can have a cathode and an anode that are electrically connected to the positive and negative output terminals 162, 164 of the second isolated DC-DC converter 150. In one instance, the diodes 143, 163 can be ideal diodes.

The bipolar auto-converter 140 can also include switches 145, 165 that are associated with the diodes 143, 163. The switches 145, 165 can be disposed in series with the diodes 143, 163 and can be operable to selectively interrupt current flow therethrough. The switches 145, 165 are normally closed, but can be opened to allow for complete shutdown of the bipolar DC-DC auto-converter module 140, as will be described in further detail below. In one embodiment, the switches 145, 165 can comprise mechanical switches, relay contacts, or solid state devices (e.g., MOSFETs or IGBTs).

When the switches 145, 165 are closed, the diodes 143, 163 can be electrically connected to the output circuits 124, 154 to enable operation of the bipolar auto-converter 140 in a bypass mode when abnormal conditions occur such as fault conditions, maintenance, or intentional shutdown of the base modules. When operating in the bypass mode, the diodes 143, 163 can still allow power to flow from the DC power source 130 to the bipolar DC load 136 even when the first and second isolated DC-DC converters 120, 150 are not actively operating, to ensure that power is still being delivered to the load, albeit at reduced voltage levels compared to normal boost operation. This can effectively provide a fail-safe operating mode that allows the system to continue operating at nominal input voltage levels even when the boost functionality of the bipolar auto-converter 140 is unavailable. It is to be appreciated that during normal operation of the bipolar auto-converter 140, even though the switches 145, 165 are closed, the diodes 143, 163 are not actively used by the system but are instead available to operate in the bypass mode if an abnormal operating condition occurs.

The switches 145, 165 can be opened to enable the bipolar auto-converter 140 to be completely shut down. During normal operation, the switches 145, 165 can be closed such that the diodes 143, 163 are available to provide the bypass mode functionality described above. However, such functionality can be problematic when a full shut down of the bipolar auto-converter 140 is desired. In particular, even if the first and second isolated DC-DC converters 120, 150 were disabled to initiate a shutdown, the diodes 143, 163 could still potentially operate in the bypass mode and continue to allow power flow from the DC power source 130 to the bipolar DC load 136. This bypass current path could maintain power delivery to the bipolar DC load 136, which could prevent the system from achieving a complete shutdown state. The switches 145, 165 can accordingly be opened when the bipolar auto-converter 140 needs to be completely shut down to eliminate the bypass current path and prevent power from the DC power source 130 from being delivered to the bipolar DC load 136. This can be particularly useful during maintenance operations, emergency shutdown procedures, or when complete isolation of the load is required. It is to be appreciated that the switches 145, 165 can be controlled by a user through a controller that can provide manual or automated control signals to open or close the switches as needed for different operating modes or safety requirements.

Figure 3:
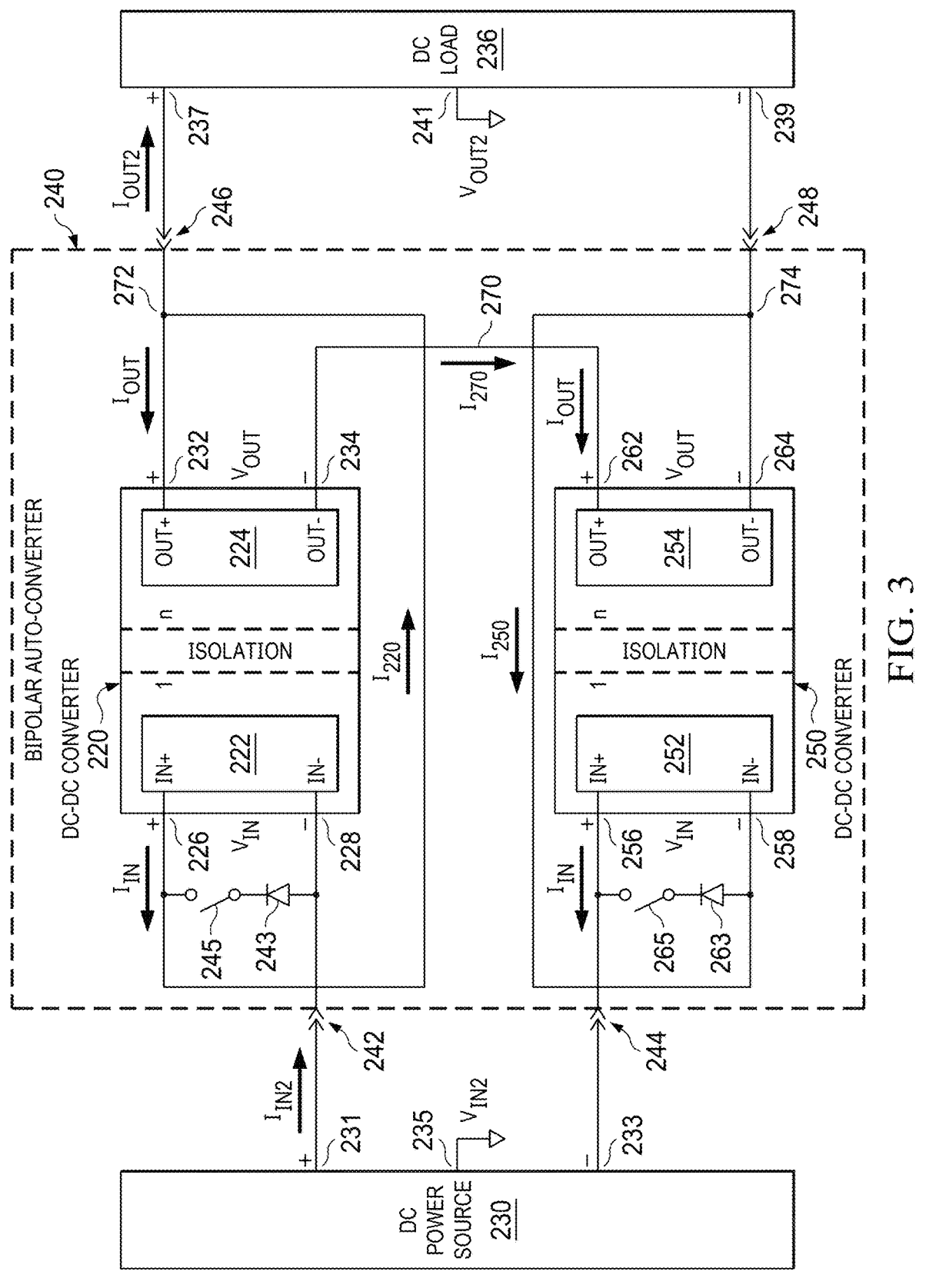
FIG. 3 is a schematic view depicting a bipolar DC-DC auto-converter module, in accordance with another embodiment.

FIG. 3 illustrates an alternative embodiment of a bipolar auto-converter 240 that is similar to, or the same in many respects as, the bipolar auto-converter 140 of FIG. 2. For example, the bipolar auto-converter 240 can include first and second isolated DC-DC converters 220, 250. The first isolated DC-DC converter 220 can include an input circuit 222 and an output circuit 224. The input circuit 222 can include a positive input terminal 226 and a negative input terminal 228. The output circuit 224 can include a positive output terminal 232 and a negative output terminal 234. An input current $I_{in}$ can be present at the positive input terminal 226 and an output current $I_{out}$ can be present at the positive output terminal 232. Likewise, the second isolated DC-DC converter 250 can include an input circuit 252 and an output circuit 254. The input circuit 252 can include a positive input terminal 256 and a negative input terminal 258. The output circuit 254 can include a positive output terminal 262 and a negative output terminal 264. An input current $I_{in}$ can be present at the positive input terminal 256 and an output current $I_{out}$ can be present at the positive output terminal 262.

The bipolar auto-converter 240 can be electrically coupled with a bipolar DC power source 230 via a positive source terminal 242 and a negative source terminal 244, and with a bipolar DC load 236 via a positive load terminal 246 and a negative load terminal 248. The bipolar DC power source 230 can provide a voltage $+V_s$ between the positive input terminal 231 and the ground terminal 235 and a voltage $-V_s$ between the negative input terminal 233 and the ground terminal 235. The bipolar DC load 236 can include a positive input terminal 237, a negative input terminal 239, and a ground terminal 241. The bipolar DC load 236 can receive a voltage $+V_L$ between the positive input terminal 237 and the ground terminal 241 and a voltage $-V_L$ between the negative input terminal 239 and the ground terminal 241.

The bipolar DC power source 230 can provide DC input power $S_{in2}$ to the bipolar auto-converter 240 in the form of an input current $I_{in2}$ at the positive source terminal 242 at an input voltage $V_{in2}$ provided across the positive and negative source terminals 242, 244, where $V_{in2}=2*V_s$. DC output power $S_{a2}$ can be delivered to the bipolar DC load 236 in the form of an output current $I_{out2}$ at the positive load terminal 246 at an output voltage $V_{out2}$ provided across the positive and negative load terminals 246, 248, where $V_{out2}=2*V_L$. The bipolar auto-converter 240 can have a voltage gain $G_{v2}$ (defined as $V_{out2}/V_{in2}$), a current gain $G_{i2}$ (defined as $I_{out2}/I_{in2}$), a power gain $G_{a2}$ (defined as $S_{a2}/(2*S_b)$), and an efficiency rating $\eta_{a2}$ (defined as $S_{a2}/S_{in2}$) which ideally is unity but, in reality, is less than unity.

The bipolar auto-converter 240 can be different from the auto-converter 140 in that the input and output circuits 222, 224 have a voltage ratio of 1:n and the input and output circuits 252, 254 also have a voltage ratio of 1:n. In addition, the negative input terminal 228 of the first isolated DC-DC converter 220 can be galvanically connected to the positive source terminal 242. The positive input terminal 256 of the second isolated DC-DC converter 250 can be galvanically connected to the negative source terminal 244. The positive output terminal 232 of the first isolated DC-DC converter 220 can be galvanically connected to the positive load terminal 246 at location 272. The negative output terminal 264 of the second isolated DC-DC converter 250 can be galvanically connected to the negative load terminal 248 at location 274. The negative output terminal 234 of the first isolated DC-DC converter 220 can be galvanically connected to the positive output terminal 262 of the second isolated DC-DC converter 250 via connector 270 to allow the output current $I_{out}$ (also indicated as $I_{270}$) to flow along the connector 270. The positive input terminal 226 of the first isolated DC-DC converter 220 can be galvanically connected to the positive output terminal 232 such that the positive input terminal 226, the positive output terminal 232, and the positive load terminal 246 are all galvanically connected together. The negative input terminal 258 of the second isolated DC-DC converter 250 can be galvanically connected to the negative output terminal 264 such that the negative input terminal 258, the negative output terminal 264, and the negative load terminal 248 are all galvanically connected together. During operation, the input current $I_{in}$ generated at the positive input terminal 226 can flow towards the location 272 (e.g., as indicated by the current $I_{220}$) and a current $I_{250}$ can be generated that flows into the negative input terminal 258.

By wiring the first and second isolated DC-DC converters 220, 250 in this manner, the bipolar auto-converter 240 can achieve the performance characteristics listed in Table 3a which are defined as a function of n.

TABLE 3a

| | |
|---|---|
| Voltage Gain $G_{v2}$ | $\dfrac{n}{n-1}$ |
| Current Gain $G_{i2}$ | $\dfrac{n-\dfrac{1}{\eta_b}}{n}$ |
| Power Gain $G_{a2}$ | $n * \eta_b - 1$ |
| Efficiency Rating $\eta_{a2}$ | $\dfrac{n-\dfrac{1}{\eta_b}}{n-1}$ |

When the output voltage $V_{out}$ of the first and second isolated base DC-DC converters 220, 250 is n VDC, the performance characteristics for the bipolar auto-converter 240 listed in Table 3b can be achieved as a function of n, where the source voltage $V_{in2}=2*V_s$ and the load voltage $V_{out2}=2*V_L$.

TABLE 3b

| | |
|---|---|
| Base Module Output Voltage $V_{out}$ | n |
| Input Voltage $V_{in2}$ | $2(n-1)$ |
| Output Voltage $V_{out2}$ | 2n |
| Input Current $I_{in2}$ | $n * \eta_b$ |
| Base Module Input current $I_{in}$ | $n * \eta_b$ |
| Output current $I_{out2}$ | $n * \eta_b - 1$ |
| Base Module Output Current $I_{out}$ | 1 |
| Current $I_{220}$ and $I_{250}$ | $n * \eta_b$ |

The performance characteristics identified in Tables 3a and 3b take into account the relative efficiencies (i.e., $\eta_b$) of the base modules and thus can be considered to be a realistic (i.e., real world) model of the performance of the bipolar auto-converter 240. The performance characteristics of the bipolar auto-converter 240 under ideal circumstances are also shown in FIG. 3 for purposes of illustration and comparison.

The bipolar auto-converter 240 can have a larger power gain $G_{a2}$, higher efficiency $\eta_{a2}$, and smaller voltage gain $G_{v2}$ than the conventional isolated DC-DC converter 20 illustrated in FIG. 1. As the value of n increases the power gain $G_{a2}$ increases, the efficiency $\eta_{a2}$ approaches unity, and the voltage gain $G_{v2}$ approaches unity. The efficiency $\eta_{a2}$ can dramatically increase for larger n values. The bipolar auto-converter 240 can effectively be a small boost negative converter and because the output current $I_{out}$ flows into the isolated DC-DC converters 220, 250 and the input current $I_{in}$ flows out of the isolated DC-DC converters 220, 250 the isolated DC-DC converters 220, 250 are configured as reverse converters. In some instances, the first and second isolated DC-DC converters 220, 250 can be forward converters that are configured to accept reverse current at the outputs 224, 254. Alternatively, the first and second isolated DC-DC converters 220, 250 can be configured as n:1 forward converters and connected backwards when the forward converters are unable to accept reverse current. In this alterative configuration, the outputs 224, 254 functionally operate as the input to the DC-DC converters 220, 250 and the inputs 222, 252 functionally operate as the outputs to the DC-DC converters 220, 250 (due to the flow of current $I_{out}$ into the outputs 224, 254).

Still referring to FIG. 3, the bipolar auto-converter 240 can include diodes 243, 263 that are similar to, or the same in many respects as, the diodes 143, 163 illustrated in FIG. 2. However, the cathode and anode of the diode 243 can be electrically connected to the positive and negative input terminals 226, 228 of the first isolated DC-DC converter 220. The cathode and anode of the diode 263 can be connected to the positive and negative input terminals 256, 258 of the second isolated DC-DC converter 250. The bipolar auto-converter 240 can also include switches 245, 265 that are similar to, or the same in many respects as, the switches 145, 165 illustrated in FIG. 2. The switches 245, 265 can be disposed in series with the diodes 243, 263 and can cooperate with the diodes 243, 263 to achieve similar, or the same, functionality as the diodes 143, 163 and the switches 145, 165 described above.

In this configuration, the diodes 243, 263 can allow for proper startup of the bipolar auto-converter 240. For example, in certain configurations, such as when the DC-DC converters 220, 250 are forward converters that are connected backwards, an initialization current should be present at the outputs 224, 254 during startup to ensure the DC-DC converters 220, 250 initialize properly. With the switches 245, 265 closed, the diodes 243, 263 can allow for the initialization current to be delivered to the outputs 224, 254 during startup. In addition, the diodes 243, 263 can facilitate proper voltage establishment across the circuits 224, 254 of the first and second isolated DC-DC converters 220, 250 while also helping to ensure that the converters 220, 250 begin operating under their designed voltage conditions by providing a controlled current path during the startup sequence. Without the diodes 243, 263, the bipolar auto-converter 240 could experience difficulty in establishing the proper operating voltages needed for reliable converter startup.

Figure 4:
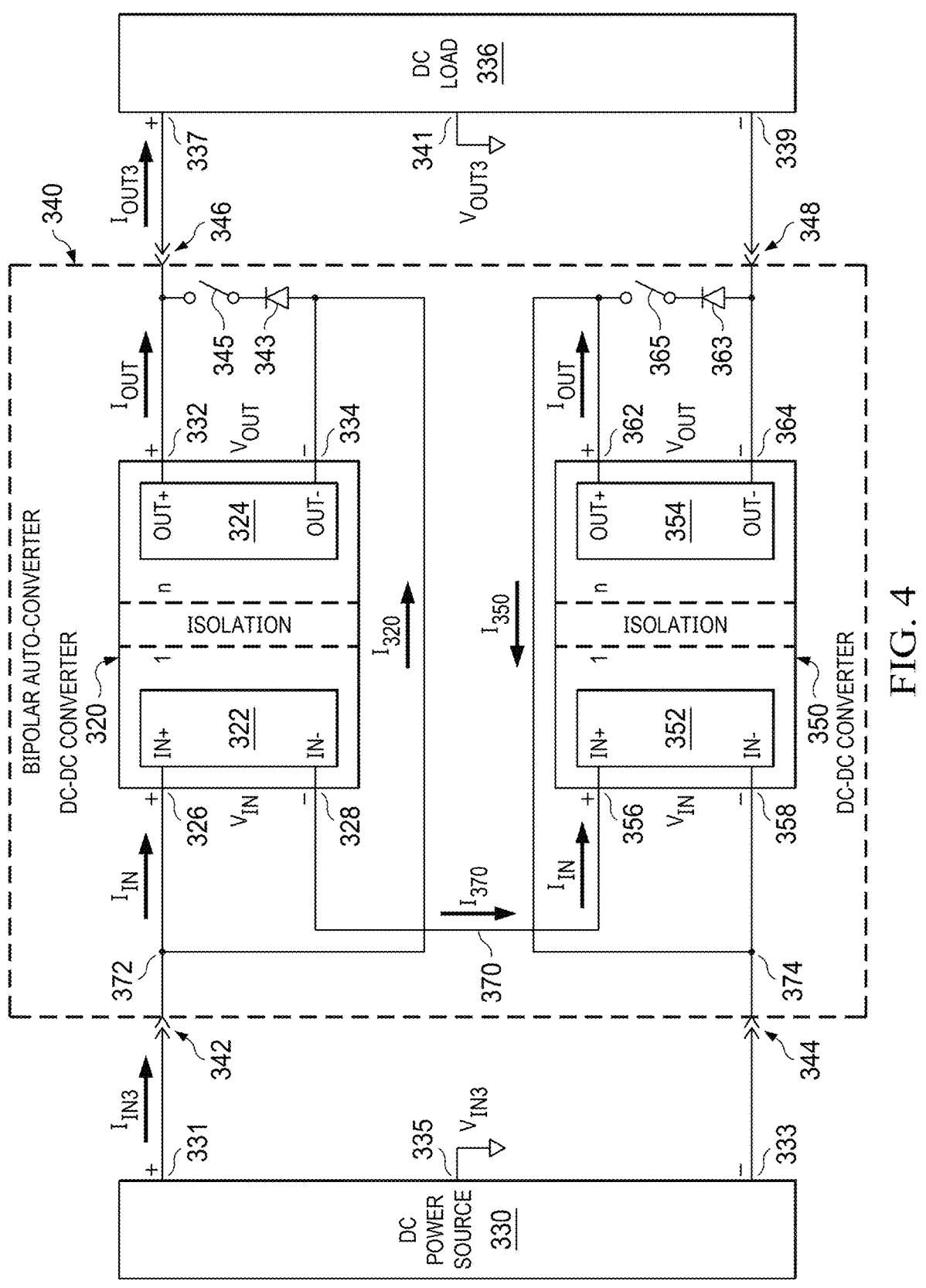
FIG. 4 is a schematic view depicting a bipolar DC-DC auto-converter module, in accordance with another embodiment.

FIG. 4 illustrates another alternative embodiment of a bipolar auto-converter 340 that is similar to, or the same in many respects as, the bipolar auto-converter 140 of FIG. 2. For example, the bipolar auto-converter 340 can include first and second isolated DC-DC converters 320, 350. The first isolated DC-DC converter 320 can include an input circuit 322 and an output circuit 324. The input circuit 322 can include a positive input terminal 326 and a negative input terminal 328. The output circuit 324 can include a positive output terminal 332 and a negative output terminal 334. An input current $I_{in}$ can be present at the positive input terminal 326 and an output current $I_{out}$ can be present at the positive output terminal 332. Likewise, the second isolated DC-DC converter 350 can include an input circuit 352 and an output circuit 354. The input circuit 352 can include a positive input terminal 356 and a negative input terminal 358. The output circuit 354 can include a positive output terminal 362 and a negative output terminal 364. An input current $I_{in}$ can be present at the positive input terminal 356 and an output current $I_{out}$ can be present at the positive output terminal 362.

The bipolar auto-converter 340 can be electrically coupled with a bipolar DC power source 330 via a positive source terminal 342 and a negative source terminal 344, and with a bipolar DC load 336 via a positive load terminal 346 and a negative load terminal 348. The bipolar DC power source 330 can include a positive output terminal 331, a negative output terminal 333, and a ground terminal 335. The bipolar DC power source 330 can provide a voltage $+V_s$ between the positive input terminal 331 and the ground terminal 335 and a voltage $-V_s$ between the negative input terminal 333 and the ground terminal 335. The bipolar DC load 336 can include a positive input terminal 337, a negative input terminal 339, and a ground terminal 341. The bipolar DC load 336 can receive a voltage $+V_L$ between the positive input terminal 337 and the ground terminal 341 and a voltage $-V_L$ between the negative input terminal 339 and the ground terminal 341. The bipolar auto-converter 340 can include diodes 343, 363.

The bipolar DC power source 330 can provide DC input power $S_{in3}$ to the bipolar auto-converter 340 in the form of an input current $I_{in3}$ at the positive source terminal 342 at an input voltage $V_{in3}$ provided across the positive and negative source terminals 342, 344, where $V_{in3}=2*V_s$. DC output power $S_{a3}$ can be delivered to the bipolar DC load 336 in the form of an output current $I_{out3}$ at the positive load terminal 346 at an output voltage $V_{out3}$ provided across the positive and negative load terminals 346, 348, where $V_{out}3=2*V_L$. The bipolar auto-converter 340 can have a voltage gain $G_{v3}$ (defined as $V_{out3}/V_{in3}$), a current gain $G_{i3}$ (defined as $I_{out3}/I_{in3}$), a power gain $G_{a3}$ (defined as $S_{a3}/(2*S_b)$), and an efficiency rating $\eta_{a3}$ (defined as $S_{a3}/S_{in3}$).

The bipolar auto-converter 340 can include a connector 370 that allows the input current $I_{in}$ (also indicated as $I_{370}$) to flow along the connector 370 between the negative input terminal 328 and the positive input terminal 356. The bipolar auto-converter 340 can be different from the bipolar auto-converter 140 in that the input and output circuits 322, 324 have a voltage ratio of 1:n and the input and output circuits 352, 354 also have a voltage ratio of 1:n. During operation, the output current $I_{out}$ generated at the positive output terminal 332 can flow away from location 372 (e.g., as indicated by the current $I_{320}$) and a current $I_{350}$ can be generated that flows towards location 374.

By wiring the first and second isolated DC-DC converters 320, 350 in this manner, the bipolar auto-converter 340 can achieve the performance characteristics listed in Table 4a which are defined as a function of n.

TABLE 4a

| Voltage Gain $G_{v3}$ | $n+1$ |
|---|---|
| Current Gain $G_{i3}$ | $\dfrac{1}{\dfrac{n}{\eta_b}+1}$ |
| Power Gain $G_{a3}$ | $\dfrac{n+1}{n}$ |
| Efficiency Rating $\eta_{a3}$ | $\dfrac{n+1}{n/\eta_b+1}$ |

When the output voltage $V_{out}$ of the first and second isolated base DC-DC converters 320, 350 is n VDC, the performance characteristics for the bipolar auto-converter 340 listed in Table 4b can be achieved as a function of n, where the source voltage $V_{in3}=2*V_s$ and the load voltage $V_{out}3=2*V_L$.

TABLE 4b

| Base Module | n |
|---|---|
| Output Voltage $V_{out}$ | |
| Input Voltage $V_{in3}$ | 2 |
| Output Voltage $V_{out3}$ | $2(n + 1)$ |
| Input Current $I_{in3}$ | $\dfrac{n}{\eta_b} + 1$ |
| Base Module | $\dfrac{n}{\eta_b}$ |
| Input Current $I_{in}$ | |
| Output current $I_{out3}$ | 1 |
| Base Module | 1 |
| Output Current $I_{out}$ | |
| Current $I_{320}$ and $I_{350}$ | 1 |

The performance characteristics identified in Tables 4a and 4b take into account the relative efficiencies (i.e., $\eta_b$) of the base modules and thus can be considered to be a realistic (i.e., real world) model of the performance of the bipolar auto-converter 340. The performance characteristics of the bipolar auto-converter 340 under ideal circumstances are also shown in FIG. 4 for purposes of illustration and comparison.

The auto-converter 340 can have a smaller power gain $G_{a3}$ (e.g., closer to unity) and an efficiency $\eta_{a3}$ that approaches the efficiency $\eta_b$ of the isolated DC-DC converter 320 than the conventional isolated DC-DC converter 20 illustrated in FIG. 1. As the value of n increases, the power gain $G_{a3}$ decreases (e.g., towards unity) and the efficiency $\eta_{a3}$ of the auto-converter 340 approaches the efficiency $\eta_b$ of the isolated DC-DC converter 320. The bipolar auto-converter 340 can effectively be a large boost positive converter.

Still referring to FIG. 4, the bipolar auto-converter 340 can include diodes 343, 363 that are similar to, or the same in many respects as, the diodes 143, 163 illustrated in FIG. 2. The bipolar auto-converter 340 can also include switches 345, 365 that are similar to, or the same in many respects as, the switches 145, 165 illustrated in FIG. 2. The switches 345, 365 can be disposed in series with the diodes 343, 363 and can cooperate with the diodes 343, 363 to achieve similar, or the same, functionality as the diodes 143, 163 and the switches 145, 165 described above.

Figure 5:
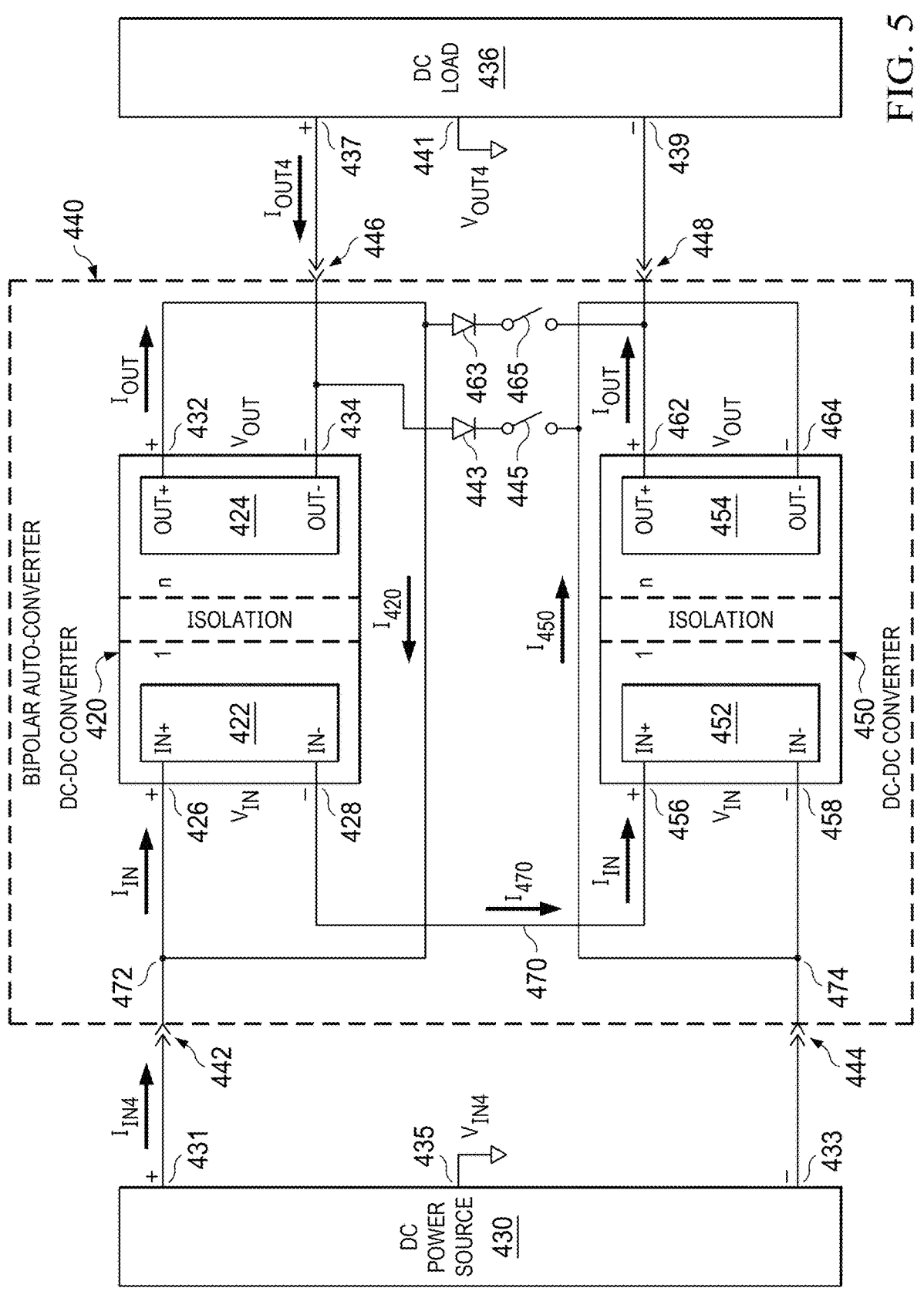
FIG. 5 is a schematic view depicting a bipolar DC-DC auto-converter module, in accordance with yet another embodiment.

FIG. 5 illustrates another alternative embodiment of a bipolar auto-converter 440 that is similar to, or the same in many respects as, the bipolar auto-converter 140 of FIG. 2. For example, the bipolar auto-converter 440 can include first and second isolated DC-DC converters 420, 450. The first isolated DC-DC converter 420 can include an input circuit 422 and an output circuit 424. The input circuit 422 can include a positive input terminal 426 and a negative input terminal 428. The output circuit 424 can include a positive output terminal 432 and a negative output terminal 434. An input current $I_{in}$ can be present at the positive input terminal 426 and an output current $I_{out}$ can be present at the positive output terminal 432. Likewise, the second isolated DC-DC converter 450 can include an input circuit 452 and an output circuit 454. The input circuit 452 can include a positive input terminal 456 and a negative input terminal 458. The output circuit 454 can include a positive output terminal 462 and a negative output terminal 464. An input current $I_{in}$ can be present at the positive input terminal 456 and an output current $I_{out}$ can be present at the positive output terminal 462.

The bipolar auto-converter 440 can be electrically coupled with a bipolar DC power source 430 via a positive source terminal 442 and a negative source terminal 444, and with a bipolar DC load 436 via a positive load terminal 446 and a negative load terminal 448. The bipolar DC power source 430 can include a positive output terminal 431, a negative output terminal 433, and a ground terminal 435. The bipolar DC power source 430 can provide a voltage $+V_s$ between the positive input terminal 431 and the ground terminal 435 and a voltage $-V_s$ between the negative input terminal 433 and the ground terminal 435. The bipolar DC load 436 can include a positive input terminal 437, a negative input terminal 439, and a ground terminal 441. The bipolar DC load 436 can receive a voltage $+V_L$ between the positive input terminal 437 and the ground terminal 441 and a voltage $-V_L$ between the negative input terminal 439 and the ground terminal 441.

The bipolar DC power source 430 can provide DC input power $S_{in4}$ to the bipolar auto-converter 440 in the form of an input current $I_{in4}$ at the positive source terminal 442 at an input voltage $V_{in4}$ provided across the positive and negative source terminals 442, 444, where $V_{in4}=2*V_s$. DC output power $S_{a4}$ can be delivered to the bipolar DC load 436 in the form of an output current $I_{out4}$ at the negative load terminal 448 at a negative output voltage $V_{out4}$ provided across the positive and negative load terminals 446, 448, where $V_{out}4=2*V_L$. The bipolar auto-converter 440 can have a voltage gain $G_{v4}$ (defined as $V_{out4}/V_{in4}$), a current gain $G_{i4}$ (defined as $I_{out4}/I_{in4}$), a power gain $G_{a4}$ (defined as $S_{a4}/(2*S_b)$), and an efficiency rating $\eta_{a4}$ (defined as $S_{a4}/S_{in4}$).

Similar to the bipolar auto-converter 140, the positive input terminal 426 of the first isolated DC-DC converter 420 can be galvanically connected to the positive source terminal 442 at location 472. The negative input terminal 428 of the first isolated DC-DC converter 420 can be galvanically connected to the positive input terminal 456 of the second isolated DC-DC converter 450 via connection 470 that allows the input current $I_{in}$ (also indicated as $I_{470}$) to flow therebetween. The negative input terminal 458 of the second isolated DC-DC converter 450 can be galvanically connected to the negative source terminal 444 at location 474. However, the bipolar auto-converter 440 can be different from the auto-converter 140 in that the input and output circuits 422, 424 have a voltage ratio of 1:n and the input and output circuits 452, 454 also have a voltage ratio of 1:n. In addition, the negative output terminal 434 of the first isolated DC-DC converter 420 can be galvanically connected to the positive load terminal 446. The positive output terminal 462 of the second isolated DC-DC converter 450 can be galvanically connected to the negative load terminal 448. The positive output terminal 432 of the first isolated DC-DC converter 420 can be galvanically connected to the positive source terminal 442 at location 472 such that positive input terminal 426, the positive output terminal 432, and the positive source terminal 442 are all galvanically connected together. The negative output terminal 464 of the second isolated DC-DC converter 450 can be galvanically connected to the negative source terminal 444 at location 474 such that the negative input terminal 458, the negative output terminal 464, and the negative source terminal 444 are all galvanically connected together. During operation, the output current $I_{out}$ generated at the positive output terminal 462 can flow away from the location 474 (e.g., as indicated by the current $I_{450}$) and a current $I_{420}$ can be generated that flows into the negative output terminal 434.

By wiring the first and second isolated DC-DC converters 420, 450 in this manner, the bipolar auto-converter 440 can achieve the performance characteristics listed in Table 5a which are defined as a function of n.

17

TABLE 5a

| | |
|---|---|
| Voltage Gain $G_{v4}$ | $-(n-1)$ |
| Current Gain $G_{i4}$ | $\dfrac{1}{n/\eta_b - 1}$ |
| Power Gain $G_{a4}$ | $\dfrac{n-1}{n}$ |
| Efficiency Rating $\eta_{a4}$ | $\dfrac{n-1}{n/\eta_b - 1}$ |

When the output voltage $V_{out}$ of the first and second isolated base DC-DC converters 420, 450 is n VDC, the performance characteristics for the bipolar auto-converter 440 listed in Table 5b can be achieved as a function of n, where the source voltage $V_{in4}=2*V_s$ and the load voltage $V_{out}4=2*V_L$.

TABLE 5b

| | |
|---|---|
| Base Module | n |
| Output Voltage $V_{out}$ | |
| Input Voltage $V_{in4}$ | 2 |
| Output Voltage $V_{out4}$ | $-2(n-1)$ |
| Input Current $I_{in4}$ | $n/\eta_b - 1$ |
| Base Module | $n/\eta_b$ |
| Input Current $I_{in}$ | |
| Output Current $I_{out4}$ | 1 |
| Output Current $I_{out}$ | 1 |
| Current $I_{420}$ and $I_{450}$ | 1 |

The performance characteristics identified in Tables 5a and 5b take into account the relative efficiencies (i.e., $\eta_b$) of the base modules and thus can be considered to be a realistic (i.e., real world) model of the performance of the bipolar auto-converter 440. The performance characteristics of the bipolar auto-converter 440 under ideal circumstances is also shown in FIG. 5 for purposes of illustration and comparison.

The auto-converter 440 can have a smaller power gain $G_{a4}$ (e.g., closer to unity) and an efficiency $\eta_{a4}$ that approaches the efficiency $\eta_b$ of the isolated DC-DC converter 420 than the conventional isolated DC-DC converter 20 illustrated in FIG. 1. As the value of n increases, the power gain $G_{a4}$ decreases (e.g., towards unity) and the efficiency $\eta_{a4}$ of the auto-converter 440 approaches the efficiency $\eta_b$ of the isolated DC-DC converter 420. The bipolar auto-converter 440 can effectively be a large boost negative converter.

Still referring to FIG. 5, the bipolar auto-converter 440 can include diodes 443, 463 that are similar to, or the same in many respects as, the diodes 143, 163 illustrated in FIG. 2. However, the anode and cathode of the diode 443 can be electrically connected to the negative output terminals 434, 464, respectively, of the first and second isolated DC-DC converters 420, 450. The anode and cathode of the diode 463 can be connected to the positive output terminals 432, 462, respectively, of the first and second isolated DC-DC converters 420, 450. The bipolar auto-converter 440 can include switches 445, 465 that are similar to, or the same in many respects as, the switches 145, 165 illustrated in FIG. 2. The switches 445, 465 can be disposed in series with the diodes 443, 463 and can cooperate with the diodes 443, 463 to achieve similar, or the same, functionality as the diodes 143, 163 and the switches 145, 165 described above.

Figure 6:
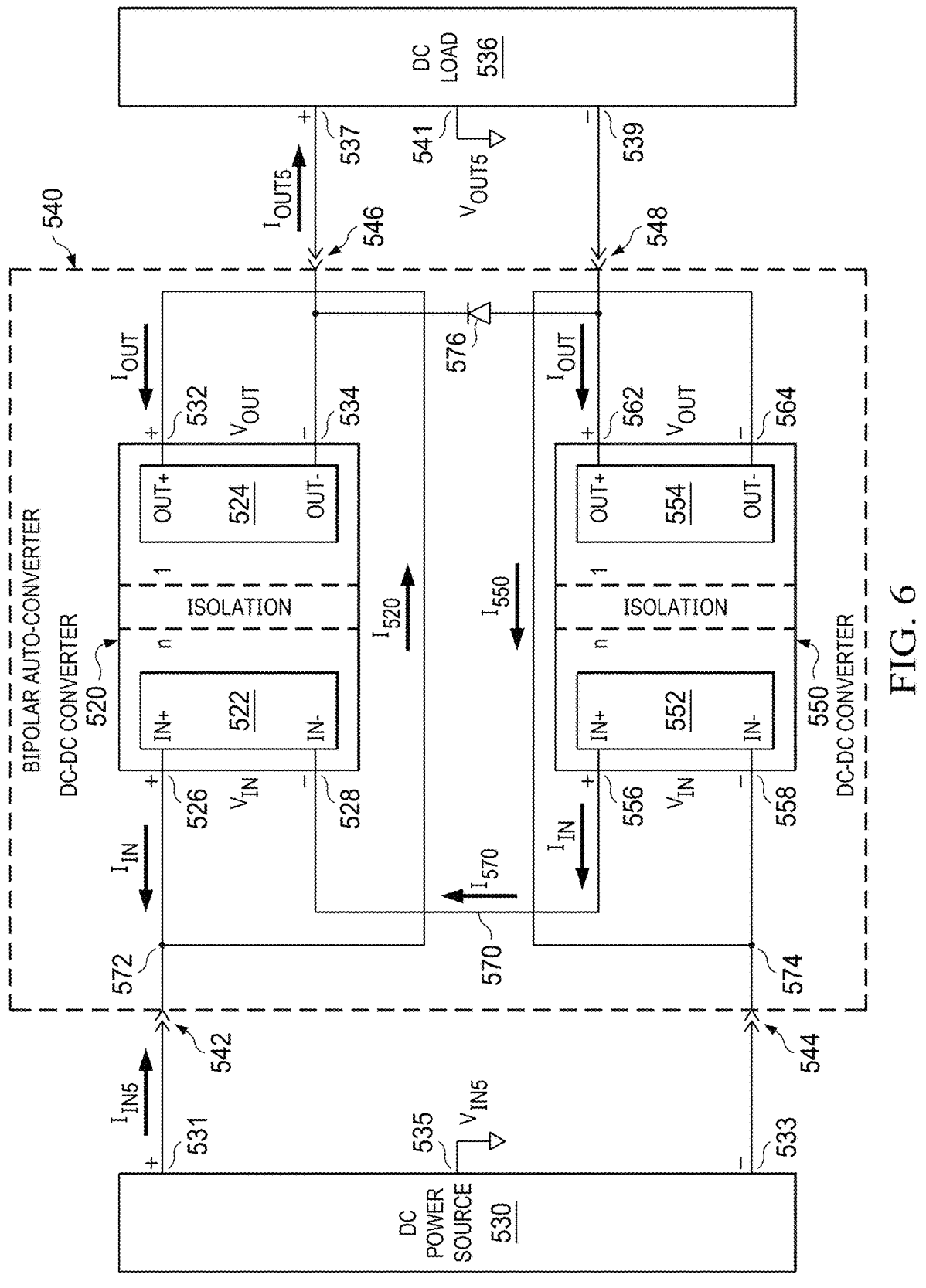
FIG. 6 is a schematic view depicting a bipolar DC-DC auto-converter module, in accordance with yet another embodiment.

FIG. 6 illustrates an alternative embodiment of a bipolar auto-converter 540 that is similar to, or the same in many respects as, the bipolar auto-converter 440 of FIG. 5. For example, the bipolar auto-converter 540 can include first and second isolated DC-DC converters 520, 550. The first isolated DC-DC converter 520 can include an input circuit 522 and an output circuit 524. The input circuit 522 can include a positive input terminal 526 and a negative input terminal 528. The output circuit 524 can include a positive output terminal 532 and a negative output terminal 534. An input current $I_{in}$ can be present at the positive input terminal 526 and an output current $I_{out}$ can be present at the positive output terminal 532. Likewise, the second isolated DC-DC converter 550 can include an input circuit 552 and an output circuit 554. The input circuit 552 can include a positive input terminal 556 and a negative input terminal 558. The output circuit 554 can include a positive output terminal 562 and a negative output terminal 564. An input current $I_{in}$ can be present at the positive input terminal 556 and an output current $I_{out}$ can be present at the positive output terminal 562.

The bipolar auto-converter 540 can be electrically coupled with a bipolar DC power source 530 via a positive source terminal 542 and a negative source terminal 544, and with a bipolar DC load 536 via a positive load terminal 546 and a negative load terminal 548. The bipolar DC power source 530 can include a positive output terminal 531, a negative output terminal 533, and a ground terminal 535. The bipolar DC power source 530 can provide a voltage $+V_s$ between the positive input terminal 531 and the ground terminal 535 and a voltage $-V_s$ between the negative input terminal 533 and the ground terminal 535. The bipolar DC load 536 can include a positive input terminal 537, a negative input terminal 539, and a ground terminal 541. The bipolar DC load 536 can receive a voltage $+V_L$ between the positive input terminal 537 and the ground terminal 541 and a voltage $-V_L$ between the negative input terminal 539 and the ground terminal 541.

The bipolar DC power source 530 can provide DC input power Sins to the bipolar auto-converter 540 in the form of an input current $I_{in5}$ at the positive source terminal 542 at an input voltage $V_{in5}$ provided across the positive and negative source terminals 542, 544, where $V_{in5}=2*V_s$. DC output power $S_{a5}$ can be delivered to the bipolar DC load 536 in the form of an output current $I_{out5}$ at the positive load terminal 546 at an output voltage $V_{out5}$ provided across the positive and negative load terminals 546, 548, where $V_{out}5=2*V_L$. The bipolar auto-converter 540 can have a voltage gain Gus (defined as $V_{out5}/V_{in5}$), a current gain $G_{i5}$ (defined as $I_{out5}/I_{in5}$), a power gain $G_{a5}$ (defined as $S_{a5}/(2*S_b)$), and an efficiency rating $\eta_{a5}$ (defined as $S_{a5}/S_{in5}$).

The bipolar auto-converter 540 can include a connector 570 that allows the input current $I_{in}$ (also indicated as $I_{570}$) to flow along the connector 570 between the negative input terminal 528 and the positive input terminal 556. The bipolar auto-converter 540 can be different from the bipolar auto-converter 440 in that the input and output circuits 522, 524 have a voltage ratio of n:1 and the input and output circuits 552, 554 also have a voltage ratio of n:1. During operation, the output current $I_{out}$ generated at the positive output terminal 562 can flow towards the location 574 (e.g., as indicated by the current $I_{550}$) and a current $I_{520}$ can be generated that flows away from location 572 and into the negative output terminal 534.

By wiring the first and second isolated DC-DC converters 520, 550 in this manner, the bipolar auto-converter 540 can achieve the performance characteristics listed in Table 6a which are defined as a function of n.

TABLE 6a

| Voltage Gain $G_{v5}$ | $\dfrac{n-1}{n}$ |
|---|---|
| Current Gain $G_{i5}$ | $\dfrac{n}{n-\eta_b}$ |
| Power Gain $G_{a5}$ | $n-1$ |
| Efficiency Rating $\eta_{a5}$ | $\dfrac{n-1}{n-\eta_b}$ |

When the output voltage Vou of the first and second isolated base DC-DC converters 520, 550 is 1 VDC, the performance characteristics for the bipolar auto-converter 540 listed in Table 6b can be achieved as a function of n, where the source voltage $V_{in5}=2*V$, and the load voltage $V_{out5}=2*V_L$.

TABLE 6b

| Base Module Input Voltage $V_{in}$ | n |
|---|---|
| Input Voltage $V_{in5}$ | 2n |
| Output Voltage $V_{out5}$ | 2(n − 1) |
| Input Current $I_{in5}$ | n − $\eta_b$ |
| Base Module Input Current $I_{in}$ | $\eta_b$ |
| Output Current $I_{out5}$ | n |
| Base Module Output Current $I_{out}$ | n |
| Current $I_{520}$ and $I_{550}$ | n |

The performance characteristics identified in Tables 6a and 6b take into account the relative efficiencies (i.e., $\eta_b$) of the base modules and thus can be considered to be a realistic (i.e., real world) model of the performance of the bipolar auto-converter 540. The performance characteristics of the bipolar auto-converter 540 under ideal circumstances are also shown in FIG. 6 for purposes of illustration and comparison.

The bipolar auto-converter 540 can have a larger power gain $G_{a5}$, higher efficiency $\eta_{a5}$, and smaller voltage gain Gus than the conventional isolated DC-DC converter 20 illustrated in FIG. 1. As the value of n increases the power gain $G_{a1}$ increases, the efficiency $\eta_{a5}$ approaches unity, and the voltage gain Gus approaches unity. The efficiency $\eta_{a5}$ can dramatically increase for larger n values. The auto-converter 540 can effectively be a small buck negative converter and because the input and output currents $I_{in}$ and $I_{out}$ flow in reverse (e.g., with the output current $I_{out}$ flowing into the first and second isolated DC-DC converters 520, 550 and the input current $I_{in}$ flowing out of the first and second isolated DC-DC converters 520, 550), the isolated DC-DC converters 520, 550 are configured as reverse converters. Alternatively, DC-DC converters 520, 550 can be configured as n:1 forward converters and connected backwards. The auto-converter 540 can provide higher power throughput and better efficiency than conventional topologies and can be smaller, more lightweight, and less expensive.

In one embodiment, the bipolar auto-converter 540 can include a diode 576 that is associated with the output circuits 524, 554, respectively, of the first and second isolated DC-DC converters 520, 550. The diode 576 can have a cathode that is electrically connected to the negative output terminal 534 of the first isolated DC-DC converter 520 and an anode that is electrically connected to the positive output terminal 562 of the second isolated DC-DC converter 550. The diode 576 can provide a free-wheel path in parallel with the output circuits 524, 554, respectively, when the DC load 536 is inductive. In particular, when the first and second isolated DC-DC converters 520, 550 are shut off or disabled, inductive loads may continue to draw current due to their stored magnetic energy. The diode 576 can therefore provide a current path that allows this inductive load current to circulate through the DC load 536, preventing potentially damaging voltage spikes that could otherwise occur when the current path is suddenly interrupted.

Figure 7:
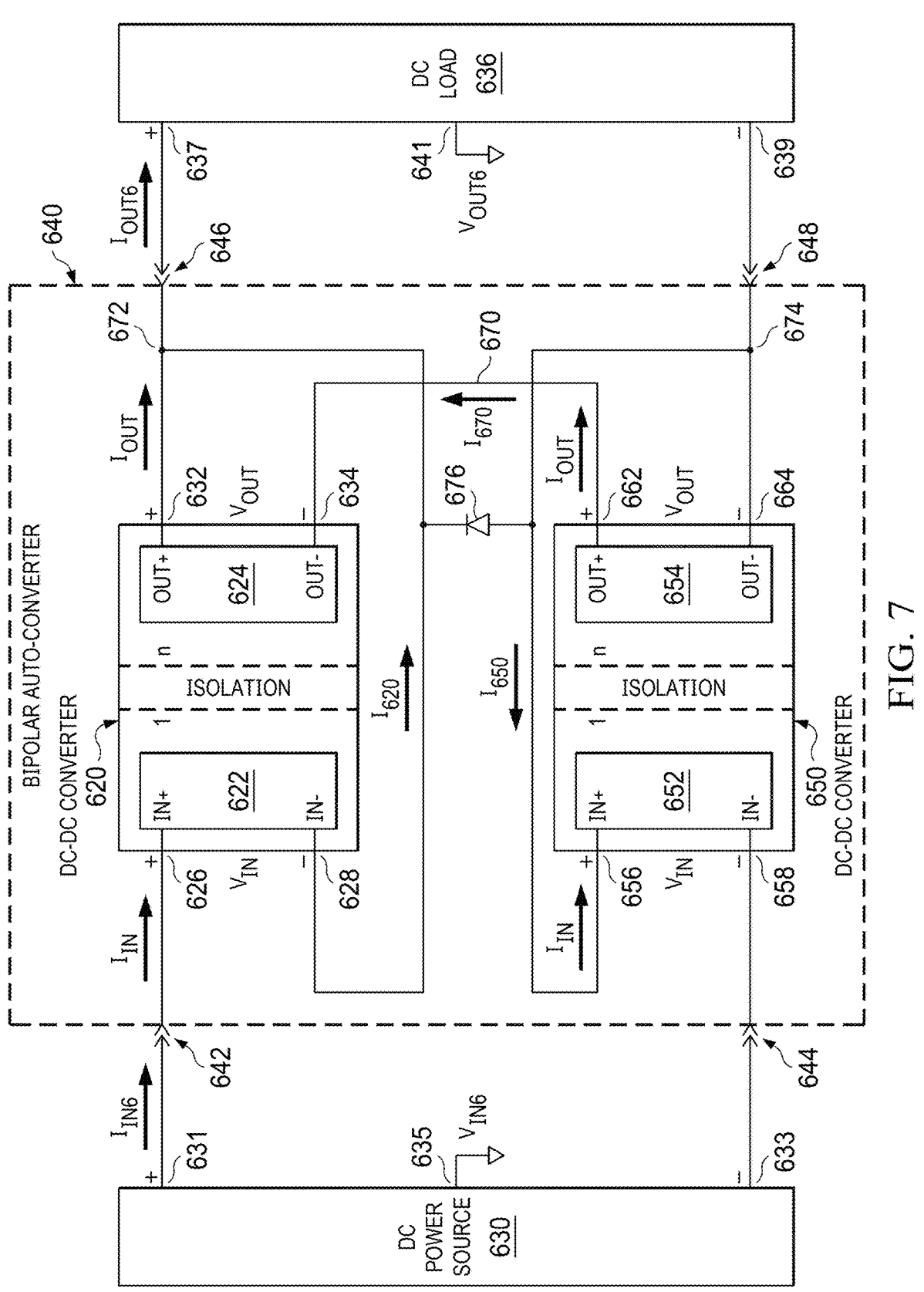
FIG. 7 is a schematic view depicting a bipolar DC-DC auto-converter module, in accordance with yet another embodiment.

FIG. 7 illustrates still yet another alternative embodiment of a bipolar auto-converter 640 that is similar to, or the same in many respects as, the bipolar auto-converter 140 of FIG. 2. For example, the bipolar auto-converter 640 can include first and second isolated DC-DC converters 620, 650. The first isolated DC-DC converter 620 can include an input circuit 622 and an output circuit 624. The input circuit 622 can include a positive input terminal 626 and a negative input terminal 628. The output circuit 624 can include a positive output terminal 632 and a negative output terminal 634. An input current $I_{in}$ can be present at the positive input terminal 626 and an output current $I_{out}$ can be present at the positive output terminal 632. Likewise, the second isolated DC-DC converter 650 can include an input circuit 652 and an output circuit 654. The input circuit 652 can include a positive input terminal 656 and a negative input terminal 658. The output circuit 654 can include a positive output terminal 662 and a negative output terminal 664. An input current $I_{in}$ can be present at the positive input terminal 656 and an output current $I_{out}$ can be present at the positive output terminal 662.

The bipolar auto-converter 640 can be electrically coupled with a bipolar DC power source 630 via a positive source terminal 642 and a negative source terminal 644, and with a bipolar DC load 636 via a positive load terminal 646 and a negative load terminal 648. The bipolar DC power source 630 can include a positive output terminal 631, a negative output terminal 633, and a ground terminal 635. The bipolar DC power source 630 can provide a voltage $+V_s$ between the positive input terminal 631 and the ground terminal 635 and a voltage $-V_s$ between the negative input terminal 633 and the ground terminal 635. The bipolar DC load 636 can include a positive input terminal 637, a negative input terminal 639, and a ground terminal 641. The bipolar DC load 636 can receive a voltage $+V_L$ between the positive input terminal 637 and the ground terminal 641 and a voltage $-V_L$ between the negative input terminal 639 and the ground terminal 641.

The bipolar DC power source 630 can provide DC input power Sind to the bipolar auto-converter 640 in the form of an input current $I_{in6}$ at the positive source terminal 642 at an input voltage $V_{in6}$ provided across the positive and negative source terminals 642, 644, where $V_{in6}=2*V_s$. DC output power $S_{a6}$ can be delivered to the bipolar DC load 636 in the form of an output current $I_{out6}$ at the positive load terminal 646 at an output voltage $V_{out6}$ provided across the positive and negative load terminals 646, 648, where $V_{out}6=2*V_L$. The bipolar auto-converter 640 can have a voltage gain $G_{v6}$ (defined as $V_{out6}/V_{in6}$), a current gain $G_{i6}$ (defined as $I_{out6}/I_{in6}$), a power gain $G_{a6}$ (defined as $S_{a6}/(2*S_b)$), and an efficiency rating $\eta_{a6}$ (defined as $S_{a6}/S_{in6}$).

The bipolar auto-converter 640 can be different from the auto-converter 140 in that the negative output terminal 634 of the first isolated DC-DC converter 620 and the positive output terminal 662 of the second isolated DC-DC converter 650 are galvanically connected together to allow the output current $I_{out}$ (also indicated as $I_{670}$) to flow along the connector 670. In addition, the negative input terminal 628, the positive output terminal 632 and the positive load terminal 646 are galvanically connected together at location 672. The positive input terminal 656, the negative output terminal 664, and the negative load terminal 648 are galvanically connected together at location 674. During operation, the input current $I_{in}$ generated at the positive input terminal 658 can flow away from the location 674 (e.g., as indicated by the current $I_{650}$) and a current $I_{620}$ can be generated that flows into the location 672.

By wiring the first and second isolated DC-DC converters 620, 650 in this manner, the bipolar auto-converter 640 can achieve the performance characteristics listed in Table 7a which are defined as a function of n.

TABLE 7a

| Voltage Gain $G_{v6}$ | $\dfrac{n}{n+1}$ |
|---|---|
| Current Gain $G_{i6}$ | $\dfrac{n+\eta_b}{n}$ |
| Power Gain $G_{p6}$ | $\dfrac{n}{\eta_b}+1$ |
| Efficiency Rating $\eta_{a6}$ | $\dfrac{n+\eta_b}{n+1}$ |

When the output voltage $V_{out}$ of the first and second isolated base DC-DC converters 620, 650 is n VDC, the performance characteristics for the bipolar auto-converter 640 listed in Table 7b can be achieved as a function of n, where the source voltage $V_{in6}=2*V_s$ and the load voltage $V_{out6}=2*V_L$ TABLE 7b

| Base Module Output Voltage $V_{out}$ | n |
|---|---|
| Input Voltage $V_{in6}$ | 2(n + 1) |
| Output Voltage $V_{out6}$ | 2n |
| Input Current $I_{in6}$ | $\dfrac{n}{\eta_b}$ |
| Base Module Input Current $I_{in}$ | $\dfrac{n}{\eta_b}$ |
| Output Current $I_{out6}$ | $\dfrac{n}{\eta_b}+1$ |
| Base Module Output current $I_{out}$ | 1 |
| Current $I_{620}$ and $I_{650}$ | $\dfrac{n}{\eta_b}$ |

The performance characteristics identified in Tables 7a and 7b take into account the relative efficiencies (i.e., $\eta_b$) of the base modules and thus can be considered to be a realistic (i.e., real world) model of the performance of the bipolar auto-converter 640. The performance characteristics of the bipolar auto-converter 640 under ideal circumstances are also shown in FIG. 7 for purposes of illustration and comparison.

The bipolar auto-converter 640 can have a larger power gain $G_{a6}$, higher efficiency $\eta_{a6}$, and smaller voltage gain $G_{v6}$ than the conventional isolated DC-DC converter 20 illustrated in FIG. 1. As the value of n increases the power gain $G_{a6}$ increases, the efficiency $\eta_{a6}$ approaches unity, and the voltage gain $G_{v6}$ approaches unity. The efficiency $\eta_{a6}$ can dramatically increase for larger n values. The bipolar auto-converter 640 can effectively be a small buck positive converter.

Still referring to FIG. 7, the bipolar auto-converter 640 can include a diode 676 that is similar to, or the same in many respects as, the diode 576 illustrated in FIG. 6. However, the cathode and anode of the diode 676 can be electrically connected to the positive output terminal 632 of the first isolated DC-DC converter 620 and the negative output terminal 664 of the second isolated DC-DC converter 650, respectively, thereby providing a freewheel current path for the load 636 when converters 620, 650 are shut off or disabled.

Figure 8:
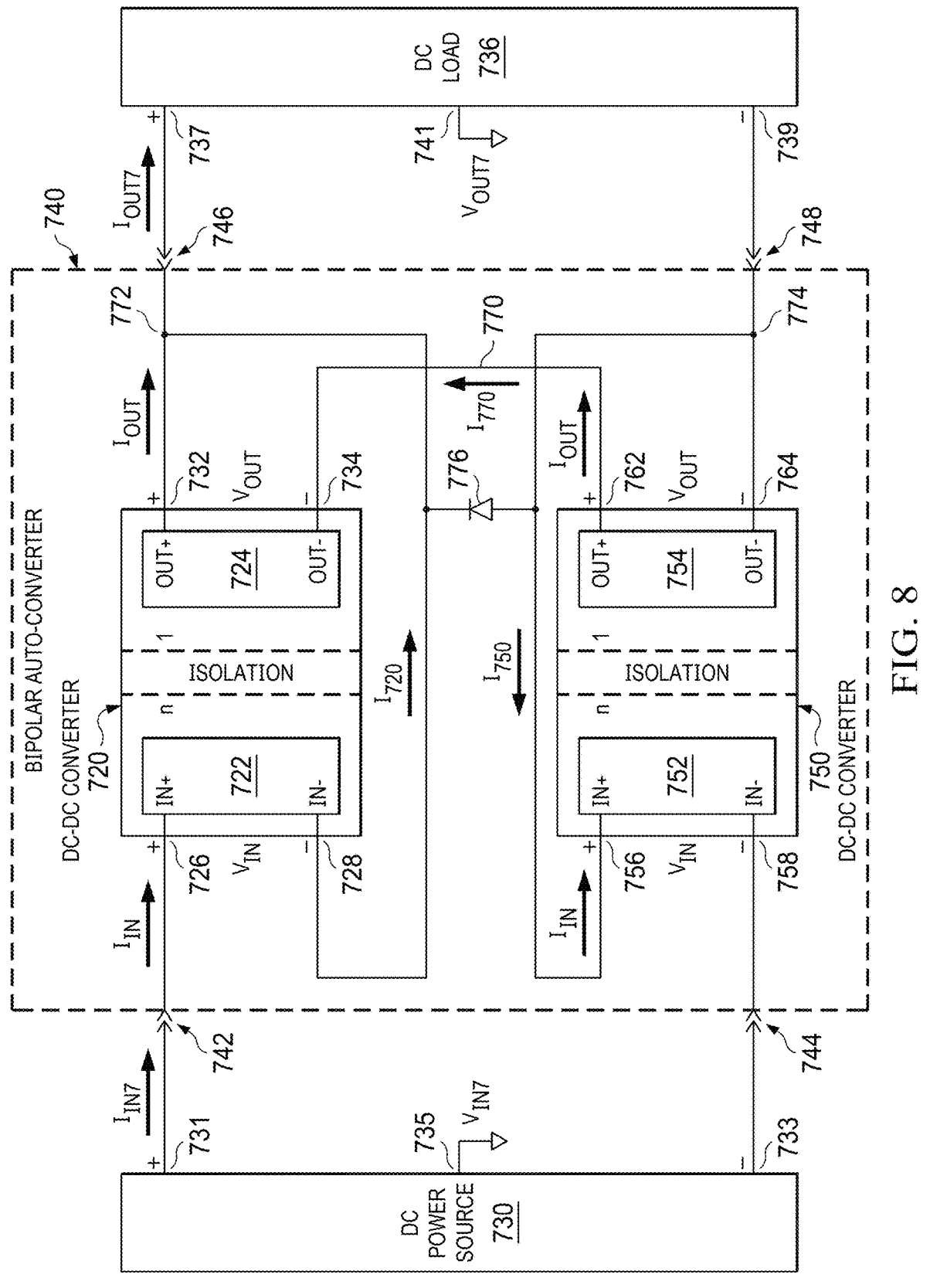
FIG. 8 is a schematic view depicting a bipolar DC-DC auto-converter module, in accordance with yet another embodiment.

FIG. 8 illustrates still yet another alternative embodiment of a bipolar auto-converter 740 that is similar to, or the same in many respects as, the bipolar auto-converter 640 of FIG. 7. For example, the bipolar auto-converter 740 can include first and second isolated DC-DC converters 720, 750. The first isolated DC-DC converter 720 can include an input circuit 722 and an output circuit 724. The input circuit 722 can include a positive input terminal 726 and a negative input terminal 728. The output circuit 724 can include a positive output terminal 732 and a negative output terminal 734. An input current $I_{in}$ can be present at the positive input terminal 726 and an output current $I_{out}$ can be present at the positive output terminal 732. Likewise, the second isolated DC-DC converter 750 can include an input circuit 752 and an output circuit 754. The input circuit 752 can include a positive input terminal 756 and a negative input terminal 758. The output circuit 754 can include a positive output terminal 762 and a negative output terminal 764. An input current $I_{in}$ can be present at the positive input terminal 756 and an output current $I_{out}$ can be present at the positive output terminal 762.

The bipolar auto-converter 740 can be electrically coupled with a bipolar DC power source 730 via a positive source terminal 742 and a negative source terminal 744, and with a bipolar DC load 736 via a positive load terminal 746 and a negative load terminal 748. The bipolar DC power source 730 can include a positive output terminal 731, a negative output terminal 733, and a ground terminal 735. The bipolar DC power source 730 can provide a voltage $+V_s$ between the positive input terminal 731 and the ground terminal 735 and a voltage $-V_s$ between the negative input terminal 733 and the ground terminal 735. The bipolar DC load 736 can include a positive input terminal 737, a negative input terminal 739, and a ground terminal 741. The bipolar DC load 736 can receive a voltage $+V_L$ between the positive input terminal 737 and the ground terminal 741 and a voltage $-V_L$ between the negative input terminal 739 and the ground terminal 741.

The bipolar DC power source 730 can provide DC input power $S_{in7}$ to the bipolar auto-converter 740 in the form of an input current $I_{in7}$ at the positive source terminal 742 at an input voltage $V_{in7}$ provided across the positive and negative source terminals 742, 744, where $V_{in7}=2*V_s$. DC output power $S_{a7}$ can be delivered to the bipolar DC load 736 in the form of an output current $I_{out7}$ at the positive load terminal 746 at an output voltage $V_{out7}$ provided across the positive and negative load terminals 746, 748, where $V_{out7}=2*V_L$. The bipolar auto-converter 740 can have a voltage gain $G_{v7}$ (defined as $V_{out7}/V_{in7}$), a current gain $G_{i7}$ (defined as $I_{out7}/I_{in7}$), a power gain $G_{a7}$ (defined as $S_{a7}/(2*S_b)$), and an efficiency rating $\eta_{a7}$ (defined as $S_{a7}/S_{in7}$).

The negative output terminal 734 of the first isolated DC-DC converter 720 and the positive output terminal 762 of the second isolated DC-DC converter 750 are galvanically connected together to allow the output current $I_{out}$ (also indicated as $I_{770}$) to flow along the connector 770. The bipolar auto-converter 740 can be different from the bipolar auto-converter 640 in that the input and output circuits 722, 724 have a voltage ratio of n:1 and the input and output circuits 752, 754 also have a voltage ratio of n:1. During operation, the input current $I_{in}$ generated at the positive input terminal 726 can flow to the location 772 (e.g., as indicated by the current $I_{720}$). The input current $I_{in}$ at the positive input terminal 756 can flow away from the location 774 (e.g., as indicated by the current $I_{750}$) and flow towards the negative input 744.

By wiring the first and second isolated DC-DC converters 720, 750 in this manner, the bipolar auto-converter 740 can achieve the performance characteristics listed in Table 8a which are defined as a function of n.

TABLE 8a

| Voltage Gain $G_{v7}$ | $\dfrac{1}{(n+1)}$ |
| --- | --- |
| Current Gain $G_{i7}$ | $n * \eta_b + 1$ |
| Power Gain $G_{a7}$ | $\dfrac{n + 1/\eta_b}{n}$ |
| Efficiency Rating $\eta_{a7}$ | $\dfrac{n * \eta_b + 1}{n+1}$ |

When the output voltage $V_{out}$ of the first and second isolated base DC-DC converters 720, 750 is 1 VDC, the performance characteristics for the bipolar auto-converter 740 listed in Table 7b can be achieved as a function of n, where the source voltage $V_{in7}=2*V_s$ and the load voltage $V_{out7}=2*V_L$.

TABLE 8b

| Base Module Input Voltage $V_{in}$ | n |
| --- | --- |
| Input Voltage $V_{in7}$ | 2(n + 1) |
| Output Voltage $V_{out7}$ | 2 |
| Input Current $I_{in7}$ | $\dfrac{1}{\eta_b}$ |
| Base Module Input Current $I_{in}$ | $\dfrac{1}{\eta_b}$ |
| Output Current $I_{out7}$ | $n + \dfrac{1}{\eta_b}$ |
| Output Current $I_{out}$ | n |
| Base Module Current $I_{720}$ and $I_{750}$ | $\dfrac{1}{\eta_b}$ |

The performance characteristics identified in Tables 8a and 8b take into account the relative efficiencies (i.e., $\eta_b$) of the base modules and thus can be considered to be a realistic (i.e., real world) model of the performance of the bipolar auto-converter 740. The performance characteristics of the bipolar auto-converter 640 under ideal circumstances are also shown in FIG. 8 for purposes of illustration and comparison.

The bipolar auto-converter 740 can have a smaller power gain $G_{a7}$ (e.g., closer to unity) and an efficiency $\eta_{a7}$ that approaches the efficiency no of the first and second isolated DC-DC converters 720, 750 than the conventional isolated DC-DC converter 20 illustrated in FIG. 1. As the value of n increases, the power gain $G_{a7}$ decreases (e.g., towards unity) and the efficiency $\eta_{a7}$ of the bipolar auto-converter 740 approaches the efficiency no of the first and second isolated DC-DC converters 720, 750. The bipolar auto-converter 740 can include a diode 776 that is similar to, or the same in many respects as, the diode 676 illustrated in FIG. 7. The bipolar auto-converter 740 can effectively be a large buck positive converter.

Figure 9:
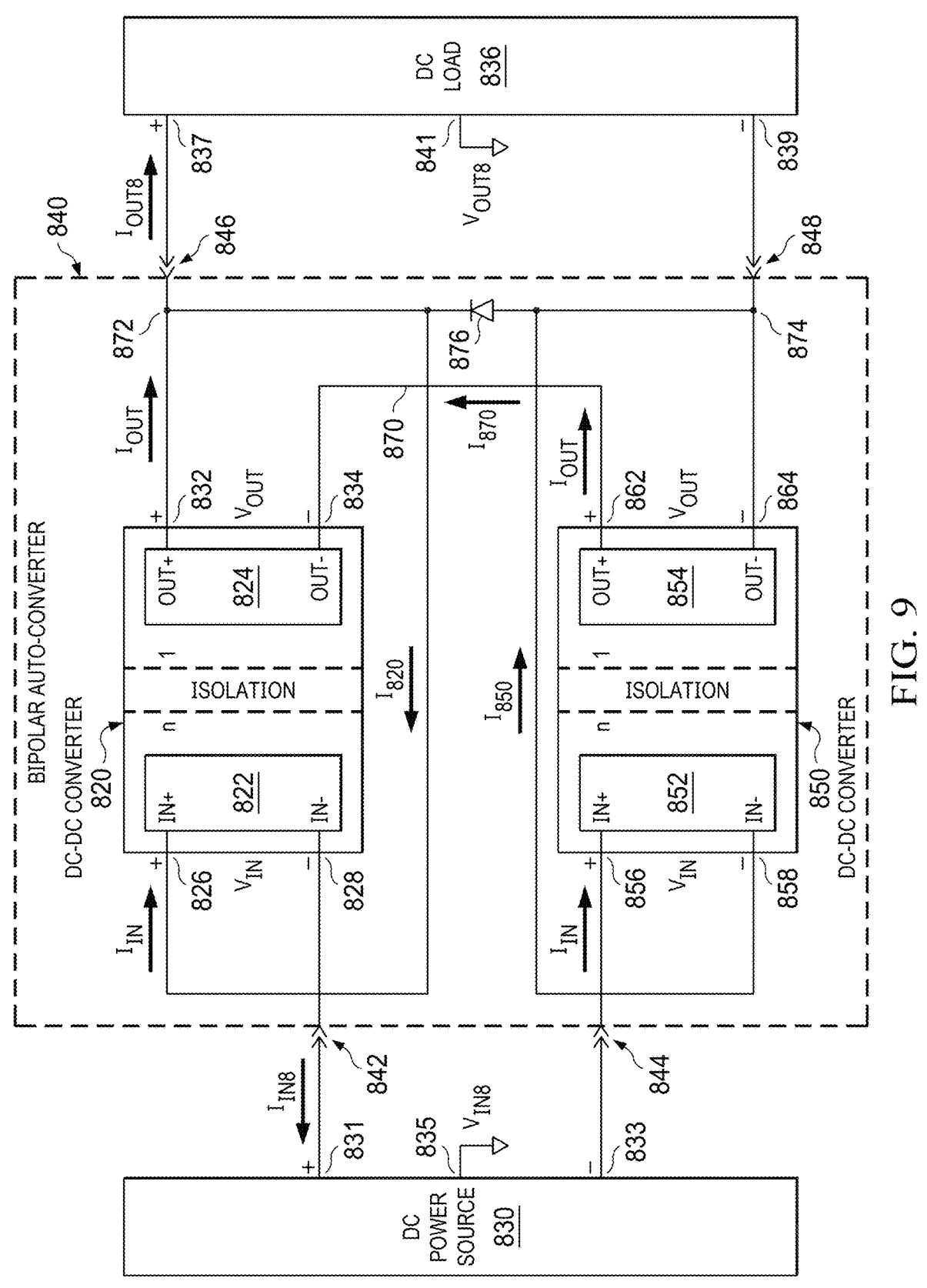
FIG. 9 is a schematic view depicting a bipolar DC-DC auto-converter module, in accordance with yet another embodiment.

FIG. 9 illustrates still yet another alternative embodiment of an auto-converter 840 that is similar to, or the same in many respects as, the auto-converter 640 of FIG. 7. For example, the bipolar auto-converter 840 can include first and second isolated DC-DC converters 820, 850. The first isolated DC-DC converter 820 can include an input circuit 822 and an output circuit 824. The input circuit 822 can include a positive input terminal 826 and a negative input terminal 828. The output circuit 824 can include a positive output terminal 832 and a negative output terminal 834. An input current $I_{in}$ can be present at the positive input terminal 826 and an output current $I_{out}$ can be present at the positive output terminal 832. Likewise, the second isolated DC-DC converter 850 can include an input circuit 852 and an output circuit 854. The input circuit 852 can include a positive input terminal 856 and a negative input terminal 858. The output circuit 854 can include a positive output terminal 862 and a negative output terminal 864. An input current $I_{in}$ can be present at the positive input terminal 856 and an output current $I_{out}$ can be present at the positive output terminal 862.

The bipolar auto-converter 840 can be electrically coupled with a bipolar DC power source 830 via a positive source terminal 842 and a negative source terminal 844, and with a bipolar DC load 836 via a positive load terminal 846 and a negative load terminal 848. The bipolar DC power source 830 can provide a voltage $+V_s$ between the positive input terminal 831 and the ground terminal 835 and a voltage $-V_s$ between the negative input terminal 833 and the ground terminal 835. The bipolar DC load 836 can include a positive input terminal 837, a negative input terminal 839, and a ground terminal 841. The bipolar DC load 836 can receive a voltage $+V_L$ between the positive input terminal 837 and the ground terminal 841 and a voltage $-V_L$ between the negative input terminal 839 and the ground terminal 841.

The bipolar DC power source 830 can provide DC input power Sins to the bipolar auto-converter 840 in the form of an input current $I_{in8}$ at the negative source terminal 844 at an input voltage $V_{in8}$ provided across the positive and negative source terminals 842, 844, where $V_{in8}=2*V_s$. DC output power $S_{a5}$ can be delivered to the bipolar DC load 836 in the form of an output current $I_{out8}$ at the positive load terminal 846 at an output voltage $V_{out8}$ provided across the positive and negative load terminals 846, 848, where $V_{out}8=2*V_L$. The bipolar auto-converter 840 can have a voltage gain $G_{v8}$ (defined as $V_{out8}/V_{in8}$), a current gain $G_{i5}$ (defined as $I_{out8}/I_{in8}$), a power gain $G_{a8}$ (defined as $S_{a8}/(2*S_b)$), and an efficiency rating $\eta_{a8}$ (defined as $S_{a8}/S_{in8}$).

The negative output terminal 834 of the first isolated DC-DC converter 820 and the positive output terminal 862 of the second isolated DC-DC converter 850 are galvanically connected together to allow the output current $I_{out}$ (also indicated as $I_{870}$) to flow along connector 870. During operation, the input current $I_{in}$ generated at the positive input terminal 856 can flow towards the location 874 (e.g., as indicated by the current $I_{850}$) and a current $I_{820}$ can be generated that flows away from the location 872.

By wiring the first and second isolated DC-DC converters 820, 850 in this manner, the bipolar auto-converter 840 can achieve the performance characteristics listed in Table 9a which are defined as a function of n.

TABLE 9a

| Voltage Gain $G_{v8}$ | $\dfrac{-1}{(n-1)}$ |
|---|---|
| Current Gain $G_{i8}$ | $n\eta_b - 1$ |
| Power Gain $G_{a8}$ | $\dfrac{(n - 1/\eta_b)}{n}$ |
| Efficiency Rating $\eta_{a8}$ | $\dfrac{n*\eta_b - 1}{n - 1}$ |

When the output voltage $V_{out}$ of the first and second isolated base DC-DC converters 820, 850 is 1 VDC, the performance characteristics for the bipolar auto-converter 840 listed in Table 9b can be achieved as a function of n, where the source voltage $V_{in8}=2*V_s$ and the load voltage $V_{out8}=2*V_L$.

TABLE 9b

| Base Module Input Voltage $V_{in}$ | n |
|---|---|
| Input Voltage $V_{in8}$ | $-2(n-1)$ |
| Output Voltage $V_{out8}$ | 2 |
| Input Current $I_{in8}$ | $1/\eta_b$ |
| Base Module Input Current $I_{in}$ | $1/\eta_b$ |
| Output Current $I_{out8}$ | $n - 1/\eta_b$ |
| Base Module Output current $I_{out}$ | 1 |
| Base Module Current $I_{820}$ and $I_{850}$ | $1/\eta_b$ |

The performance characteristics identified in Tables 9a and 9b take into account the relative efficiencies (i.e., $\eta_b$) of the base modules and thus can be considered to be a realistic (i.e., real world) model of the performance of the bipolar auto-converter 840. The performance characteristics of the bipolar auto-converter 840 under ideal circumstances are also shown in FIG. 9 for purposes of illustration and comparison.

The auto-converter 840 can have a smaller power gain $G_{a8}$ (e.g., closer to unity) and an efficiency $\eta_{a8}$ that approaches the efficiency no of the isolated DC-DC converter 820 than the conventional isolated DC-DC converter 20 illustrated in FIG. 1. As the value of n increases, the power gain $G_{a8}$ decreases (e.g., towards unity) and the efficiency $\eta_{a8}$ of the auto-converter 840 approaches the efficiency $\eta_b$ of the isolated DC-DC converter 820. The bipolar auto-converter 840 can effectively be a large buck negative converter.

Still referring to FIG. 9, the bipolar auto-converter 840 can include a diode 876 that is similar to, or the same in many respects as, the diode 676 illustrated in FIG. 7. The diode 876 can provide reliable starting functionality for the bipolar auto-converter 840 in a similar manner as described above with respect to the diodes 243, 263.

The foregoing description of embodiments and examples of the disclosure has been presented for purposes of illustration and description. It is not intended to be exhaustive or to limit the disclosure to the forms described. Numerous modifications are possible in light of the above teachings. Some of those modifications have been discussed and others will be understood by those skilled in the art. The embodiments were chosen and described in order to best illustrate the principles of the disclosure and various embodiments as are suited to the particular use contemplated. The scope of the disclosure is, of course, not limited to the examples or embodiments set forth herein, but can be employed in any number of applications and equivalent devices by those of ordinary skill in the art. Rather it is hereby intended the scope of the invention be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A bipolar DC-DC auto-converter module comprising:
a positive source terminal;
a negative source terminal that cooperates with the positive source terminal to facilitate electrical connection of a DC power source to the auto-converter module;
a positive load terminal;
a negative load terminal that cooperates with the positive load terminal to facilitate electrical connection of an electrical load to the auto-converter module; and
a first isolated DC-DC converter comprising:
a first input circuit comprising:
a first positive input terminal that is galvanically connected to the positive source terminal; and
a first negative input terminal; and
a first output circuit that is galvanically isolated from the first input circuit within the first isolated DC-DC converter, the first output circuit comprising:
a first positive output terminal that is galvanically connected to the positive load terminal; and
a first negative output terminal that is galvanically connected to the first positive input terminal; and
a second isolated DC-DC converter that comprises:
a second input circuit comprising:
a second positive input terminal that is galvanically connected to the first negative input terminal; and
a second negative input terminal that is galvanically connected to the negative source terminal; and
a second output circuit that is galvanically isolated from the second input circuit within the second isolated DC-DC converter, the second output circuit comprising:
a second positive output terminal that is galvanically connected to the second negative input terminal; and
a second negative output terminal that is galvanically connected to the negative load terminal.

2. The bipolar DC-DC auto-converter module of claim 1 further comprising a diode electrically connected to the first positive output terminal and the first negative output terminal.

3. The bipolar DC-DC auto-converter module of claim 2 further comprising a switch disposed in series with the diode, the switch operable to selectively interrupt current flow through the diode.

4. The bipolar DC-DC auto-converter module of claim 1 further comprising a diode electrically connected to the second positive output terminal and the second negative output terminal.

5. The bipolar DC-DC auto-converter module of claim 4 further comprising a switch disposed in series with the diode, the switch operable to selectively interrupt current flow through the diode.

6. The bipolar DC-DC auto-converter module of claim 1 wherein the first isolated DC-DC converter and the second isolated DC-DC converter each have a voltage ratio of n:1, where n is greater than 1.

7. The bipolar DC-DC auto-converter module of claim 1 wherein the first isolated DC-DC converter and the second isolated DC-DC converter each have a voltage ratio of 1:n, where n is greater than 1.

8. The bipolar DC-DC auto-converter module of claim 1 further comprising:
  a first diode electrically connected to the first positive output terminal and the first negative output terminal;
  a first switch disposed in series with the first diode, the first switch being operable to selectively interrupt current flow through the first diode;
  a second diode electrically connected to the second positive output terminal and the second negative output terminal; and
  a second switch disposed in series with the second diode, the second switch being operable to selectively interrupt current flow through the second diode.

9. A bipolar DC-DC auto-converter module comprising:
  a positive source terminal;
  a negative source terminal that cooperates with the positive source terminal to facilitate electrical connection of a DC power source to the auto-converter module;
  a positive load terminal;
  a negative load terminal that cooperates with the positive load terminal to facilitate electrical connection of an electrical load to the auto-converter module; and
  a first isolated DC-DC converter comprising:
    a first input circuit comprising:
      a first positive input terminal; and
      a first negative input terminal that is galvanically connected to the positive source terminal; and
    a first output circuit that is galvanically isolated from the first input circuit within the first isolated DC-DC converter, the first output circuit comprising:
      a first positive output terminal that is galvanically connected to the first positive input terminal and the positive load terminal; and
      a first negative output terminal;
  a second isolated DC-DC converter that comprises:
    a second input circuit comprising:
      a second positive input terminal that is galvanically connected to the negative source terminal; and
      a second negative input terminal; and
    a second output circuit that is galvanically isolated from the second input circuit within the second isolated DC-DC converter, the second output circuit comprising:
      a second positive output terminal that is galvanically connected to the first negative output terminal; and
      a second negative output terminal that is galvanically connected to the second negative input terminal and the negative load terminal.

10. The bipolar DC-DC auto-converter module of claim 9 further comprising a diode electrically connected to the first positive input terminal and the first negative input terminal.

11. The bipolar DC-DC auto-converter module of claim 10 further comprising a switch disposed in series with the diode, the switch operable to selectively interrupt current flow through the diode.

12. The bipolar DC-DC auto-converter module of claim 9 further comprising a diode electrically connected to the second positive input terminal and the second negative input terminal.

13. The bipolar DC-DC auto-converter module of claim 12 further comprising a switch disposed in series with the diode, the switch operable to selectively interrupt current flow through the diode.

14. The bipolar DC-DC auto-converter module of claim 9 further comprising a diode electrically connected to the first positive output terminal and the second negative output terminal.

15. The bipolar DC-DC auto-converter module of claim 9 wherein the first isolated DC-DC converter and the second isolated DC-DC converter each have a voltage ratio of n:1, where n is greater than 1.

16. The bipolar DC-DC auto-converter module of claim 9 wherein the first isolated DC-DC converter and the second isolated DC-DC converter each have a voltage ratio of 1:n, where n is greater than 1.

17. The bipolar DC-DC auto-converter module of claim 9 further comprising:
  a first diode electrically connected to the first positive input terminal and the first negative input terminal;
  a first switch disposed in series with the first diode, the first switch being operable to selectively interrupt current flow through the first diode;
  a second diode electrically connected to the second positive input terminal and the second negative input terminal; and
  a second switch disposed in series with the second diode, the switch being operable to selectively interrupt current flow through the second diode.

18. A bipolar DC-DC auto-converter module comprising:
  a positive source terminal;
  a negative source terminal that cooperates with the positive source terminal to facilitate electrical connection of a DC power source to the auto-converter module;
  a positive load terminal;
  a negative load terminal that cooperates with the positive load terminal to facilitate electrical connection of an electrical load to the auto-converter module; and
  a first isolated DC-DC converter comprising:
    a first input circuit comprising:
      a first positive input terminal that is galvanically connected to the positive source terminal; and
      a first negative input terminal; and
    a first output circuit that is galvanically isolated from the first input circuit within the first isolated DC-DC converter, the first output circuit comprising:
      a first positive output terminal that is galvanically connected to the first positive input terminal; and
      a first negative output terminal that is galvanically connected to the positive load terminal; and
  a second isolated DC-DC converter that comprises:
    a second input circuit comprising:
      a second positive input terminal that is galvanically connected to the first negative input terminal; and
      a second negative input terminal that is galvanically connected to the negative source terminal; and
    a second output circuit that is galvanically isolated from the second input circuit within the second isolated DC-DC converter, the second output circuit comprising:
      a second positive output terminal that is galvanically connected to the negative load terminal; and a second negative output terminal that is galvanically connected to the second negative input terminal.

19. The bipolar DC-DC auto-converter module of claim 18 further comprising a diode electrically connected to the first negative output terminal and the second negative output terminal.

20. The bipolar DC-DC auto-converter module of claim 19 further comprising a switch disposed in series with the diode, the switch operable to selectively interrupt current flow through the diode.

21. The bipolar DC-DC auto-converter module of claim 18 further comprising a diode electrically connected to the first positive output terminal and the second positive output terminal.

22. The bipolar DC-DC auto-converter module of claim 21 further comprising a switch disposed in series with the diode, the switch operable to selectively interrupt current flow through the diode.

23. The bipolar DC-DC auto-converter module of claim 18 further comprising a diode electrically connected to the first negative output terminal and the second positive output terminal.

24. The bipolar DC-DC auto-converter module of claim 18 wherein the first isolated DC-DC converter and the second isolated DC-DC converter each have a voltage ratio of n:1, where n is greater than 1.

25. The bipolar DC-DC auto-converter module of claim 18 wherein the first isolated DC-DC converter and the second isolated DC-DC converter each have a voltage ratio of 1:n, where n is greater than 1.

26. The bipolar DC-DC auto-converter module of claim 18 further comprising:

a first diode electrically connected to the first negative output terminal and the second negative output terminal;

a first switch disposed in series with the first diode, the first switch being operable to selectively interrupt current flow through the first diode;

a second diode electrically connected to the first positive output terminal and the second positive output terminal; and a second switch disposed in series with the second diode, the second switch being operable to selectively interrupt current flow through the second diode.

27. A bipolar DC-DC auto-converter module comprising:

a positive source terminal;

a negative source terminal that cooperates with the positive source terminal to facilitate electrical connection of a DC power source to the auto-converter module;

a positive load terminal;

a negative load terminal that cooperates with the positive load terminal to facilitate electrical connection of an electrical load to the auto-converter module; and a first isolated DC-DC converter comprising:

a first input circuit comprising:

a first positive input terminal that is galvanically connected to the positive source terminal; and a first negative input terminal; and a first output circuit that is galvanically isolated from the first input circuit within the first isolated DC-DC converter, the first output circuit comprising:

a first positive output terminal that is galvanically connected to the first negative input terminal and the positive load terminal; and a first negative output terminal;

a second isolated DC-DC converter that comprises:

a second input circuit comprising:

a second positive input terminal; and a second negative input terminal that is galvanically connected to the negative source terminal; and a second output circuit that is galvanically isolated from the second input circuit within the second isolated DC-DC converter, the second output circuit comprising:

a second positive output terminal that is galvanically connected to the first negative output terminal; and a second negative output terminal that is galvanically connected to the second positive input terminal and the negative load terminal.

28. The bipolar DC-DC auto-converter module of claim 27 further comprising a diode electrically connected to the first positive output terminal and the second negative output terminal.

29. The bipolar DC-DC auto-converter module of claim 27 wherein the first isolated DC-DC converter and the second isolated DC-DC converter each have a voltage ratio of 1:n, where n is greater than 1.

30. The bipolar DC-DC auto-converter module of claim 27 wherein the first isolated DC-DC converter and the second isolated DC-DC converter each have a voltage ratio of n:1, where n is greater than 1.

* * * * *